United States Patent
Watanabe et al.

(10) Patent No.: US 12,202,057 B2
(45) Date of Patent: *Jan. 21, 2025

(54) DRILL AND METHOD OF PRODUCING DRILLED PRODUCT

(71) Applicant: SUBARU CORPORATION, Tokyo (JP)

(72) Inventors: Masao Watanabe, Tokyo (JP); Hiroyuki Sugawara, Tokyo (JP); Tatsuo Nakahata, Tokyo (JP); Ryohei Ono, Tokyo (JP); Shinya Matsuo, Tokyo (JP); Hideharu Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,364

(22) Filed: Jul. 29, 2021

(65) Prior Publication Data
US 2022/0063004 A1   Mar. 3, 2022

(30) Foreign Application Priority Data

Sep. 3, 2020 (JP) .................... 2020-148602

(51) Int. Cl.
*B23B 51/08* (2006.01)
(52) U.S. Cl.
CPC ........ *B23B 51/08* (2013.01); *B23B 2226/275* (2013.01); *B23B 2251/04* (2013.01);
(Continued)
(58) Field of Classification Search
CPC . B23B 51/02; B23B 2251/04; B23B 2251/14; B23B 51/08; B23B 2251/18;
(Continued)

(56) References Cited

U.S. PATENT DOCUMENTS 6,964,546 B1   11/2005 Vakil
7,575,401 B1 *   8/2009 Garrick ................. B23B 51/108
                                                                408/230
(Continued)

FOREIGN PATENT DOCUMENTS

CN          2283538 Y    6/1998
CN      103658775 A  *  3/2014 ............ B23B 51/08
(Continued)

OTHER PUBLICATIONS

Extended European Search Report dated Jan. 21, 2022 for European Patent Application No. 21189007.4 (9 pages).
(Continued)

*Primary Examiner* — Ryan Rufo
(74) *Attorney, Agent, or Firm* — Smith, Gambrell & Russell, LLP

(57) ABSTRACT

According to one implementation, a drill includes the first cutting edges, the second cutting edges and a deflection reducer. The first cutting edges drill a prepared hole to a workpiece. The first cutting edges are formed in a tip side of the drill. The first point angle and each first relief angle of the first cutting edges continuously or intermittently decrease from the tip side toward a rear end side of the drill. The second cutting edges finish the prepared hole. The second cutting edges are formed at positions away in the rear end side from the first cutting edges. The second cutting edges have the second relief angles at a maximum diameter position. The deflection reducer reduces deflection of the second cutting edges. The deflection reducer is formed between the first cutting edges and the second cutting edges. The deflection reducer is inserted into the prepared hole.

17 Claims, 11 Drawing Sheets

(52) U.S. Cl.
CPC ..... *B23B 2251/047* (2022.01); *B23B 2251/14* (2013.01); *B23B 2251/188* (2022.01)

(58) Field of Classification Search
CPC ........ B23B 2251/082; B23B 2251/047; B23B 2251/188
See application file for complete search history.

(56) References Cited

U.S. PATENT DOCUMENTS

| | | | |
|---|---|---|---|
| 8,052,361 B2* | 11/2011 | Mir | ............. B23B 51/02 408/230 |
| 8,734,067 B2 | 5/2014 | Saito et al. | |
| 9,168,593 B2* | 10/2015 | Saito | ............. B23B 51/02 |
| 9,180,531 B2 | 11/2015 | Nakahata et al. | |
| 9,409,239 B2 | 8/2016 | Higashiwaki et al. | |
| 9,656,328 B2* | 5/2017 | Saito | ............. B23B 51/009 |
| 9,827,617 B2 | 11/2017 | Saito et al. | |
| 10,589,364 B2* | 3/2020 | Terashima | ............. B23B 51/02 |
| 11,192,196 B2* | 12/2021 | Hechtle | ............. B23D 77/006 |
| 11,311,947 B2* | 4/2022 | Ogawa | ............. B23D 77/00 |
| 2003/0202853 A1 | 10/2003 | Ko et al. | |
| 2006/0056929 A1 | 3/2006 | Haenle | |
| 2010/0166517 A1 | 7/2010 | Saito et al. | |
| 2010/0232899 A1 | 9/2010 | Saito et al. | |
| 2012/0263548 A1* | 10/2012 | Harris | ............. B23B 51/00 408/224 |
| 2012/0321403 A1 | 12/2012 | Highashiwaki et al. | |
| 2013/0136552 A1 | 5/2013 | Ono et al. | |
| 2014/0363249 A1* | 12/2014 | Oka | ............. B23B 51/02 408/224 |
| 2021/0031277 A1 | 2/2021 | Watanabe et al. | |
| 2022/0234121 A1 | 7/2022 | Watanabe et al. | |

FOREIGN PATENT DOCUMENTS

| | | | | |
|---|---|---|---|---|
| CN | 108655468 A | | 10/2018 | |
| CN | 208019480 U | | 10/2018 | |
| DE | 203 07 258 U1 | | 9/2004 | |
| DE | 10 2016 221 363 A1 | | 3/2018 | |
| EP | 2 202 018 A1 | | 6/2010 | |
| EP | 2505287 A2 | * | 10/2012 | ........... B23B 51/009 |
| EP | 2 535 129 A1 | | 12/2012 | |
| EP | 2 799 171 A1 | | 11/2014 | |
| JP | S64-42815 U | | 3/1989 | |
| JP | H06-032253 Y | | 8/1994 | |
| JP | 2008036759 A | * | 2/2008 | ........... B23B 35/005 |
| JP | 2010-214478 A | | 9/2010 | |
| JP | 2012135873 A | * | 7/2012 | |
| JP | 2015-221467 A | | 12/2015 | |
| WO | WO-2013099841 A1 | * | 7/2013 | ........... B23B 51/009 |
| WO | 2017/208939 A1 | | 12/2017 | |

OTHER PUBLICATIONS

Extended European Search Report mailed Jun. 6, 2022 for European Patent Application No. 22150390.7 (8 pages).
First US Office Action issued May 11, 2021 in U.S. Appl. No. 16/847,971 (13 pages).
Extended European Search Report Issued Oct. 20, 2020 in European Patent Application No. 20 169 792.7 (6 pages).
Non-Final Office Action mailed Oct. 21, 2021 in U.S. Appl. No. 16/847,971 (10 pages).
Japanese First Office Action mailed Mar. 23, 2023 in Japanese Patent Application No. 2019-143399 (7 pages in Japanese with English translation). [Family member of U.S. Appl. No. 16/847,971, which has been issued to Applicant as U.S. Pat. No. 11,400,524].
Non Final Office Action mailed Mar. 20, 2023 in U.S. Appl. No. 17/569,712 (11 pages).
Final Office Action mailed Sep. 11, 2023 in U.S. Appl. No. 17/569,712 (10 pages).
First Office Action mailed Feb. 29, 2024 for Chinese Patent Application No. 202010299029.X (8 pages in Chinese; 4 pages English machine translation). [Family member of U.S. Appl. No. 16/847,971, which has been issued to Applicant as U.S. Pat. No. 11,400,524.].
First Office Action mailed Mar. 15, 2024 for Japanese Patent Application No. 2020-148602 (4 pages in Japanese; 5 pages English translation). [Family member of U.S. Appl. No. 17/388,364].
Notice of Allowance mailed Mar. 18, 2022 in U.S. Appl. No. 16/847,971.
Notice of Allowance mailed Dec. 4, 2023 in U.S. Appl. No. 17/569,712.
First Office Action mailed Nov. 8, 2024 for Korean Patent Application No. 10-2020-0049126 (6 pages in Korean; 7 pages English translation). [Family member of U.S. Appl. No. 16/847,971, which has been issued to Applicant as U.S. Pat. No. 11,400,524].
First Office Action mailed Jun. 25, 2024 for Japanese Patent Application No. 2021-012526 (4 pages in Japanese; 5 pages English translation). [Family member of U.S. Appl. No. 17/569,712, which has been issued to Applicant as U.S. Pat. No. 11,969,803].
Second Office Action mailed Jul. 31, 2024 for Chinese Patent Application No. 202010299029.X (5 pages in Chinese; 6 pages English translation). [Family member of U.S. Appl. No. 16/847,971, which has been issued to Applicant as U.S. Pat. No. 11,400,524].

* cited by examiner

DRILL AND METHOD OF PRODUCING DRILLED PRODUCT

CROSS REFERENCES TO RELATED APPLICATIONS

This application is based upon and claims the benefit of priority from Japanese Patent Application No. 2020-148602, filed on Sep. 3, 2020; the entire contents of which are incorporated herein by reference.

FIELD

Implementations described herein relate generally to a drill and a method of producing a drilled product.

BACKGROUND

Conventionally, a drill having cutting edges of which point angle and relief angle change continuously toward the maximum diameter position of the cutting edges, and also having a relief angle at the maximum diameter position of the cutting edges, is known as a drill which can drill not only a metal but also an FRP (Fiber Reinforced Plastic), such as GFRP (Glass Fiber Reinforced Plastic) and CFRP (Carbon Fiber Reinforced Plastic), which is also called a composite material, with high quality (for example, refer to Japanese Patent Application Publication JP2008-36759 A, Japanese Patent Application Publication JP2012-135873 A and Japanese Patent Application Publication JP2010-214478 A). Since this drill can machine a hole with remarkably higher quality and have a remarkably extended tool life by improving wear resistance, the drill has become famous with a common name of R-drill (registered trademark).

Moreover, since a projected shape in a radial direction of cutting edges whose point angle continuously decreases becomes a curved one, such as a parabola or a circle, a multi-point-angle drill whose point angle intermittently decreases has also been proposed from a viewpoint of simplifying production (for example, refer to Japanese Patent Application Publication JP2015-221467 A).

When drilling is performed by attaching the above-mentioned R-drill (registered trademark) to a machine tool, such as a drill press, a milling machine or a machining center, of which spindle has high rigidity, a hole can be machined with high quality and exchange frequency of the drill caused by wear of the drill can be remarkably reduced.

However, when drilling is performed by attaching the R-drill (registered trademark) to a handheld tool rotating device, such as a hand tool, or a drilling device, such as a simple drill press, of which spindle has low rigidity or accuracy, the quality of a hole sometimes deteriorate. As a concrete example, it has been confirmed that there was a case where vibration of the R-drill (registered trademark) became large during drilling, and thereby the shape of a cross section of a hole did not become circular but polygonal when the number of the cutting edges is not less than three, as a result of drilling tests performed by holding the R-drills (registered trademark) with a handheld tool rotating device. Such deterioration in quality has been confirmed whether a material of a workpiece is a composite material or a metal.

Accordingly, an object of the present invention is to allow drilling a workpiece, made of a composite material, a metal, or the like, with high accuracy, not only in a case where a spindle of a drilling machine has sufficient rigidity but also in a case where drilling is performed by a handheld tool rotating device, and a spindle of a drilling machine has low rigidity or accuracy.

SUMMARY OF THE INVENTION

In general, according to one implementation, a drill includes at least one first cutting edge, at least one second cutting edge and a deflection reducer. The at least one first cutting edge drills a prepared hole to a workpiece. The at least one first cutting edge is formed in a tip side of the drill. The first point angle of the at least one first cutting edge at a tip position is more than 0 degrees and less than 180 degrees. The first point angle continuously or intermittently decreases from the tip side toward a rear end side of the drill. The first relief angle of the at least one first cutting edge continuously or intermittently decreases from the tip side toward the rear end side. The at least one second cutting edge finishes the prepared hole. The at least one second cutting edge is formed at a position away in the rear end side from the at least one first cutting edge. The at least one second cutting edge has a second relief angle at a maximum diameter position of the at least one second cutting edge. The deflection reducer reduces deflection of the at least one second cutting edge. The deflection reducer is formed between the at least one first cutting edge and the at least one second cutting edge. The deflection reducer is inserted into the prepared hole.

Further, according to one implementation, a method of producing a drilled product includes drilling the workpiece with the above-mentioned drill in order to produce the drilled product.

DETAILED DESCRIPTION

A drill and a method of producing a drilled product according to implementations of the present invention will be described with reference to the accompanying drawings.

First Implementation

Structure and Function of Drill

Figure 1:
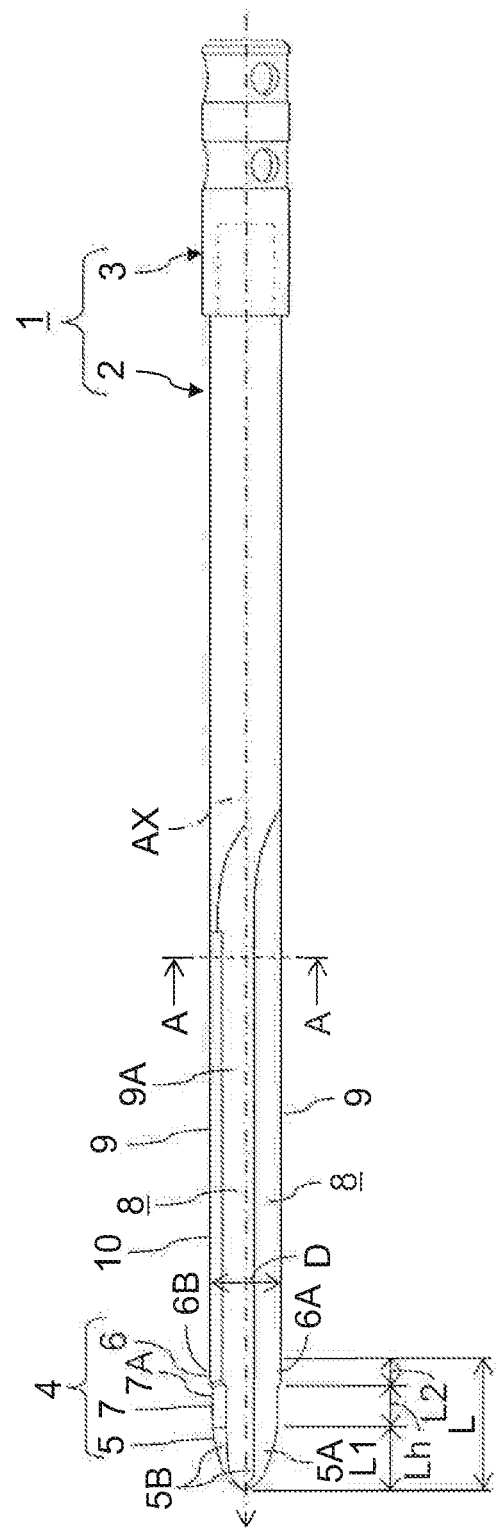
FIG. 1 is a front view, of which arrow direction is partially changed, of a drill according to the first implementation of the present invention.
Figure 2:
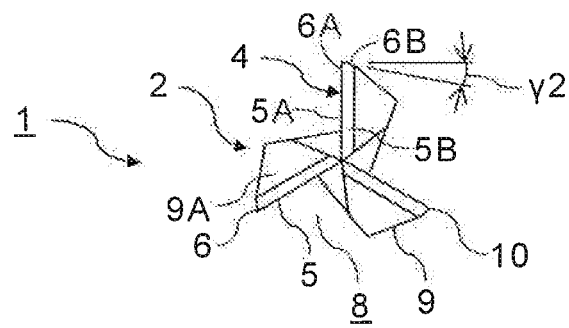
FIG. 2 is an enlarged left side view of the drill shown in FIG. 1.
Figure 3:
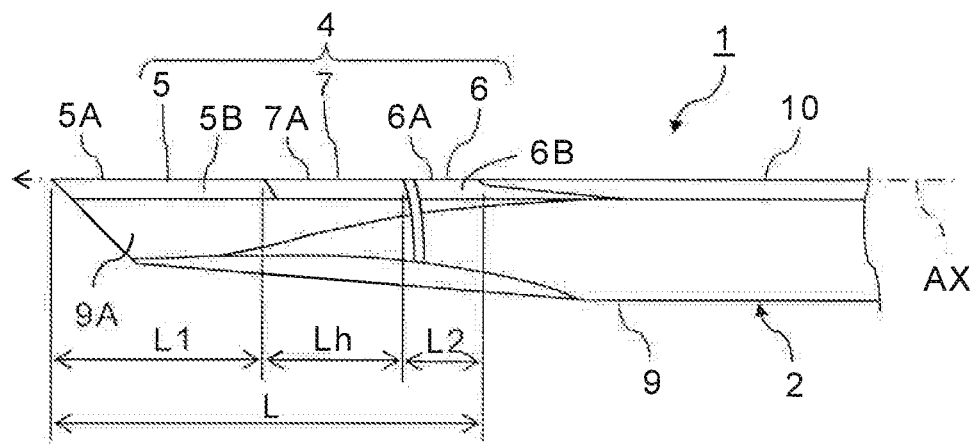
FIG. 3 is an enlarged partial top view of the tip part of the drill shown in FIG. 1.
Figure 4:
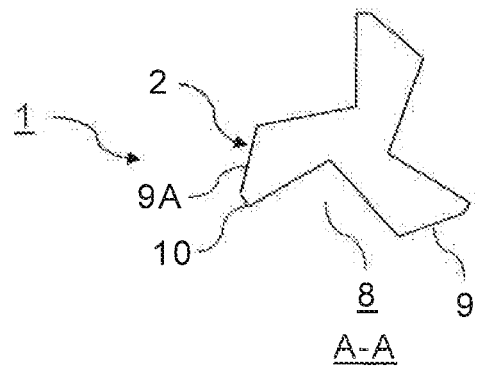
FIG. 4 is an enlarged cross-sectional view at the position A-A of the drill shown in FIG. 1.

FIG. 1 is a front view, of which arrow direction is partially changed, of a drill according to the first implementation of the present invention. FIG. 2 is an enlarged left side view of the drill shown in FIG. 1. FIG. 3 is an enlarged partial top view of the tip part of the drill shown in FIG. 1. FIG. 4 is an enlarged cross-sectional view at the position A-A of the drill shown in FIG. 1. Note that, the lower side than the tool axis AX in FIG. 1 shows the outline of the outer shape of a cutting edge of the drill when the rake face of the cutting edge is developed so that the rake face may be parallel to the figure, and illustration of the detailed outline of the inner shape of the cutting edge has been omitted since the cutting edges formed in the drill are symmetric with each other around the tool axis AX, i.e., the shapes of the cutting edges formed in the drill are the same.

A drill 1 is a drilling tool which can drill a workpiece with high quality whether the workpiece is an FRP or a metal. That is, the drill 1 has a shape which can drill not only a metal, such as aluminum and titanium, but also an FRP, such as CFRP and GFRP, and a material obtained by overlapping an FRP with a metal, with high accuracy.

The drill 1 has a body 2, in the tip side in the tool axis AX direction of the drill 1, and a shank 3 in the rear end side in the tool axis AX direction of the drill 1. Each of the body 2 and the shank 3 can be made of a typical material, such as a cemented carbide, a tool steel or a PCB (Polycrystalline diamond). When the body 2 and the shank 3 are made of a tool steel, it is practical to use a high-speed steel. Moreover, a desired coating, such as diamond coating or DLC (Diamond Like Carbon) coating, may be applied in order to improve wear resistance, thermal shock resistance, resistance to melting, or the like, regardless of a material of the body 2 and the shank 3.

The shank 3 is a portion for holding the drill 1 with a holder of a handheld tool rotating device, a machine tool or the like. Although the shank 3 has a special shape which can be easily attached to and detached from a holder in an example shown in FIG. 1, the shank 3 may have a desired shape, such as a straight shank or a tapered shank. When the shank 3 has a simple shape like a straight shank and a tapered shank, the body 2 and the shank 3 may consist of an integral material, i.e., the drill 1 may be a solid drill. On the contrary, when the shape of the shank 3 is complicated, the drill 1 may be a tipped drill of which the body 2 is inserted into and bonded with the shank 3 as exemplified in FIG. 1.

A cutting edge part 4 for drilling a workpiece is formed at the tip of the body 2. The cutting edge part 4 has tip cutting edges 5, which are the first cutting edges, reamer cutting edges 6, which are the second cutting edges, and a holding part 7. The tip cutting edges 5 are formed in the tip side of the cutting edge part 4 in the tool axis AX direction. Meanwhile, the reamer cutting edges 6 are formed in the rear end side of the cutting edge part 4 in the tool axis AX direction. The reamer cutting edges 6 are formed at positions away, in the rear end side, from the tip cutting edges 5. The holding part 7 is formed between the tip cutting edges 5 and the reamer cutting edges 6.

Each of the tip cutting edges 5 has a rake face 5A and a flank 5B, and a ridgeline formed as a line of intersection of the rake face 5A and the flank 5B is a tip of the tip cutting edge 5. Similarly, each of the reamer cutting edges 6 also has a rake face 6A and a flank 6B, and a ridgeline formed as a line of intersection of the rake face 6A and the flank 6B is a tip of the reamer cutting edge 6. Note that, a flank is also called a second face, and a relief angle, which is a clearance angle between a flank and a machined face, is also called a second angle.

Although the three tip cutting edges 5 and reamer cutting edges 6 have been formed in the cutting edge part 4 in an example shown in FIG. 1 to FIG. 4, the number of the tip cutting edges 5 and reamer cutting edges 6 is flexible. Specifically, although the drill 1 exemplified in FIG. 1 to FIG. 4 has three cutting edges consisting of the tip cutting edges 5 and the reamer cutting edges 6, formed on three lands 9 formed between three grooves 8 respectively, adjacent planar relief faces 9A, the drill 1 may have two cutting edges, four cutting edges, or five cutting edges. Since the tip cutting edges 5 and the reamer cutting edges 6 are formed in the lands 9 respectively, the number of the tip cutting edges 5 is the same as the number of the reamer cutting edges 6. That is, the number of the tip cutting edges 5 and the number of the reamer cutting edges 6 are equal to the number of the lands 9.

Moreover, although the drill 1 exemplified in FIG. 1 to FIG. 4 is a straight fluted drill having the untwisted grooves 8, the drill 1 may be a twisted drill having the twisted grooves 8. When the groove 8 is a V-groove, i.e., the drill 1 is a straight fluted drill, the rigidity of the drill 1 can be increased. On the contrary, when the groove 8 is a twisted groove, cutting resistance can be decreased.

Figure 5:
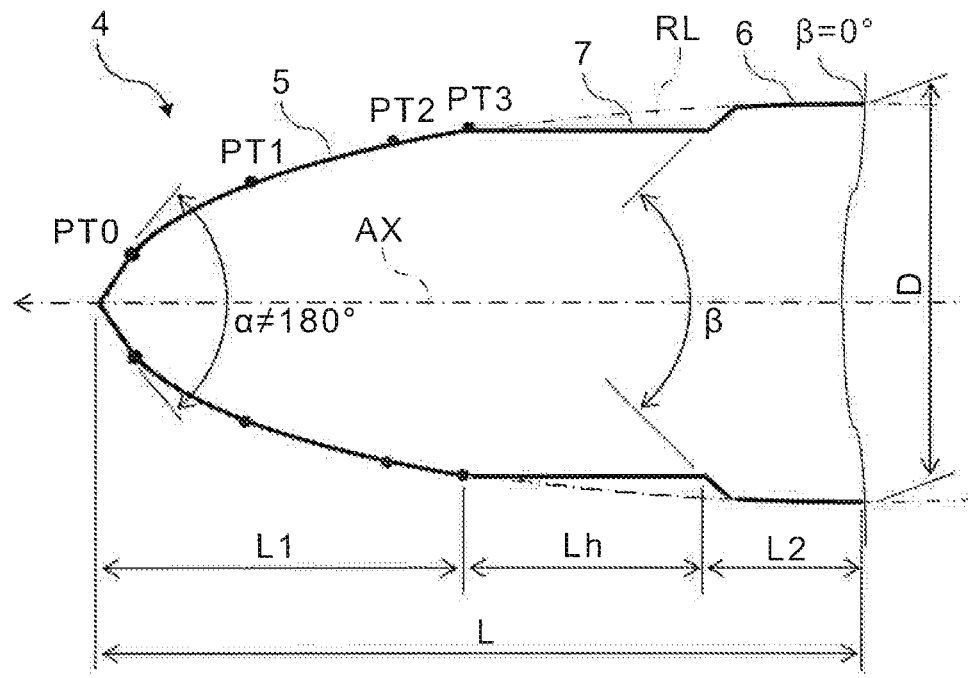
FIG. 5 is an enlarged projection view of the cutting edge part on a projection plane parallel to the tool axis for explaining the shape of each cutting edge part shown in FIG. 1.
Figure 6:
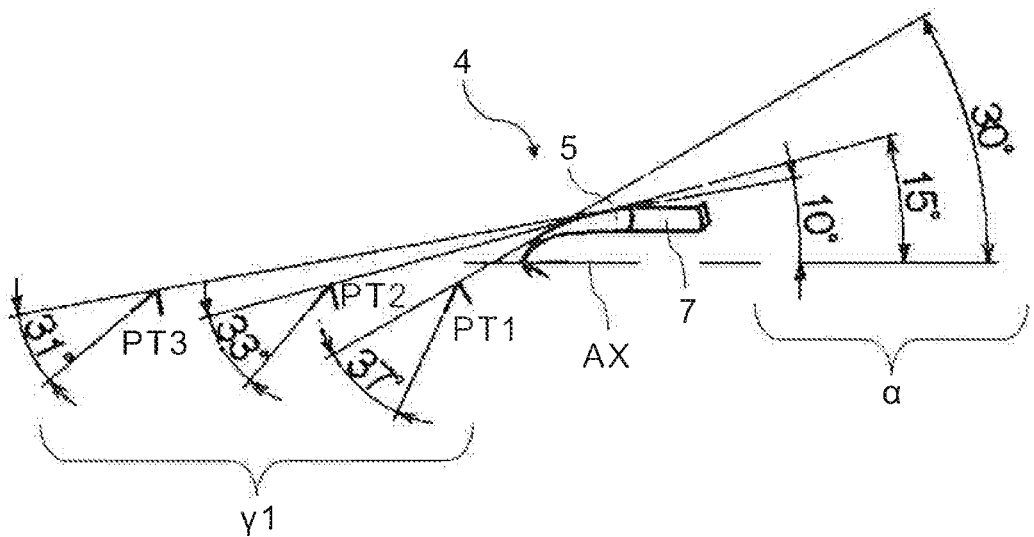
FIG. 6 is a partial front view showing an example of the point angles and the relief angles of the tip cutting edge shown in FIG. 1.

FIG. 5 is an enlarged projection view of the cutting edge part 4 on a projection plane parallel to the tool axis AX for explaining the shape of each cutting edge part 4 shown in FIG. 1. FIG. 6 is a partial front view showing an example of the point angles α and the relief angles γ1 of the tip cutting edge 5 shown in FIG. 1.

FIG. 5 shows an example of a shape obtained by projecting a passing area of the cutting edge part 4, on a projection plane parallel to the tool axis AX, in case of rotating the cutting edge part 4 around the tool axis AX. That is, FIG. 5 shows an example of a shape obtained by projecting the cutting edge part 4, rotated around the tool axis AX, in a direction perpendicular to the tool axis AX.

The point angle α of the tip cutting edges 5 is more than 0° and less than 180° at the tip. Specifically, the point angle α of the tip cutting edges 5 at the tip of the drill 1 in the tool axis AX direction has a relation of 0°<α<180°. In other words, the drill 1 is not a flat drill or a candle shaped drill (a candle sharpened drill) of which point angle is 180°.

A point angle of a typical drill is 118° or 120°, and the point angle α at the tool center position at the tip of the drill 1 can be also determined as an appropriate angle according to cutting conditions, such as a material of a workpiece and the tool diameter D. When a workpiece is made of a metal or an FRP, it is desirable to set the point angle α at the tool center position at the tip of the tip cutting edges 5 to 90°<α<150° from a viewpoint of making cutting conditions, such as cutting resistance, preferable.

Moreover, each tip cutting edge 5 has such a shape that the point angle α continuously decreases from the tip side of the tool axis AX direction and the drill 1 toward the rear end side. Therefore, the point angle α at the tip of the tip cutting edges 5 becomes the maximum value of the point angle α. Moreover, the diameter of the tip cutting edges 5 continuously increases from the tip side toward the rear end side. Meanwhile, the relief angle γ1 of each tip cutting edge 5 is also formed so as to continuously decrease from the tip side of the tool axis AX direction and the drill 1 toward the rear end side. Therefore, the relief angle γ1 of each tip cutting edge 5 also becomes the maximum value at the tip.

FIG. 6 shows an example of the point angle α and the relief angle γ1 at the position P1, the position P2 and the position P3 of the tip cutting edge 5. In an example shown in FIG. 6, the point angle α of the tip cutting edge 5 gradually and continuously decreases so as to be 60°, 30° and 20° between the tip side and the rear end side while the relief angle γ1 of the tip cutting edge 5 gradually and continuously decreases so as to be 37°, 33° and 31° between the tip side and the rear end side.

It is desirable to determine the relief angle γ1 at the tip of the tip cutting edge 5 so that a relation of γ1>(180°−α)/2 may be established between the relief angle γ1 at the tip and the point angle α at the tip, from a viewpoint of improving cutting conditions. Therefore, when the point angle α at the tip of the tip cutting edge 5 is 120°, the relief angle γ1 at the tip of the tip cutting edge 5 can be determined to about 45°, for example.

When the point angle α of the tip cutting edges 5 is decreased continuously, an effect that the risk of chipping can be reduced can be attained since no corner which may cause chipping is generated on the ridgeline of each tip cutting edge 5. As a result, the tool life of the drill 1 can be increased. In addition, when the point angle α of the tip cutting edges 5 is decreased gradually, an effect that generation of delamination can be reduced in case of drilling an FRP can be attained. This is because delamination temporarily generated due to drilling an FRP by the tip cutting edges 5, having the relatively large point angle α, in the tip side of the drill 1 is removed by drilling by the tip cutting edges 5, having the relatively small point angle α, continuing to the rear side because of small cutting resistance.

Moreover, the more a shape of the ridgelines of the tip cutting edges 5 on a projection plane parallel to the tool axis AX is approximated to a parabola, the more the volume of a workpiece cut by the ridgelines per unit length in the tool axis AX direction becomes uniform. Therefore, an effect that cutting resistance can be made uniform over the whole tip cutting edges 5 can be attained. When cutting resistance can be made uniform over the whole tip cutting edges 5, it becomes possible to reduce not only the generation of delamination and burrs at the time of drilling an FRP but also wear of the tip cutting edges 5.

Meanwhile, when a shape of the ridgelines of the tip cutting edges 5 on a projection plane parallel to the tool axis AX is approximated to an ellipse, the volume of a workpiece cut by the ridgelines per unit length in the tool axis AX direction can be decreased at a constant rate as the ridgelines are located in the rearer side of the tip cutting edges 5. Therefore, the situation that the wear in posterior portions of the tip cutting edges 5, of which a cutting speed is relatively fast due to different radii of rotation, progresses earlier than the wear in anterior portions of the tip cutting edges 5, of which a cutting speed is relatively slow, can be avoided, and thereby an effect that the degree of progress of the wear can be made uniform over the whole tip cutting edges 5 can be attained. When the degree of progress of the wear can be made uniform over the whole tip cutting edges 5, the life of the tip cutting edges 5 can be improved.

Therefore, the shape of the ridgelines of the tip cutting edges 5 on a projection plane can be approximated to a parabola or an ellipse depending on an effect which is thought as important. As a matter of course, the shape of the ridgelines of the tip cutting edges 5 on a projection plane may be determined so that a part may have a shape close to an ellipse while another part may have a shape close to a parabola.

Note that, if the shape of the ridgelines of the tip cutting edges 5 on a projection plane parallel to the tool axis AX is entirely made to a parabola or an ellipse, the point angle α at the tip of the tip cutting edges 5 becomes 180°. Therefore, it is necessary to determine the shape of the ridgeline of the tip cutting edge 5 so that the point angle α at the tip of the tip cutting edges 5 may become an angle desirable for drilling a workpiece.

Accordingly, the shape of the ridgeline of the tip cutting edge 5 can be determined so that only a portion near the tip of the ridgelines of the tip cutting edges 5, e.g., the tip side from positions PT0 shown in FIG. 5, may be straight lines on a projection plane as exemplified by FIG. 5, FIG. 6 and the like, for example. In this case, the shape of the ridgeline of the tip cutting edge 5 can be determined so that the shape on a projection plane of the ridgelines, in the rear side from the positions PT0, following the linear ridgelines at the tip of the tip cutting edges 5 may be a quadratic curve, such as a parabola or an ellipse.

Alternatively, the shape of the ridgeline of the tip cutting edge 5 may be determined so that an intersection point of two line-symmetric parabolas derived by offsetting their symmetrical axes in the directions opposite to each other by a same distance from a projected line of the tool axis AX on a projection plane or an intersection point of two line-symmetric ellipses derived by offsetting their long axes in the directions opposite to each other by a same distance from a projected line of the tool axis AX on a projection plane may be a projected point of the tip of the tip cutting edges 5 and a part of the two symmetric parabolas or ellipses in the side close to the projected line of the tool axis AX may be a projected line of the ridgelines of the tip cutting edges 5.

Since producing the tip cutting edges 5 of which outline on a projection plane becomes an ellipse, two ellipses, a parabola or two parabolas becomes complicated, the ellipse, the two ellipses, the parabola or the two parabolas may be simulated by connecting circles to each other along the ellipse, the two ellipses, the parabola or the two parabolas serving as a reference line RL or reference lines RL. In case of an example shown in FIG. 5, a position PT0 may be connected with a position PT1 by a single circle having a same radius, the position PT1 may be connected with a position PT2 by another single circle having a larger radius, and the position PT2 may be connected with a position PT3 by another single circle having an even larger radius, on a projection plane, for example. That is, determining the shape of the ridgeline of the tip cutting edge 5 so that a projected line of the ridgelines of the tip cutting edges 5 becomes a smooth curve without corners obtained by connecting lines and circles with each other can attain a merit of approximating the projected line of the ridgelines to an ellipse, two ellipses, a parabola or two parabolas while reducing manufacturing costs.

When the relief angle γ1 of each tip cutting edge 5 is gradually decreased as mentioned above as well as the point angle α of the tip cutting edges 5 is gradually decreased, an effect that wear resistance of the tip cutting edges 5 can be improved is attained. This is because corners easily worn out are not generated on the flank 5B of each tip cutting edge 5 when the relief angle γ1 of each tip cutting edge 5 is continuously and smoothly decreased.

A rake angle of each tip cutting edge 5 can be determined according to a material of a workpiece. When the rake angle of each tip cutting edge 5 is made 0°, the rake face 5A of each tip cutting edge 5 is made perpendicular to the cutting face of a workpiece, an effect that delamination is hardly generated at the time of drilling an FRP is attained. This is because the tip cutting edges 5 without a rake angle can finely cut an FRP and reduce open seams of fibers included in the FRP. Therefore, when improving quality of a hole machined on an FRP is considered as important, the rake angle of each tip cutting edge 5 can be made zero.

On the contrary, when each tip cutting edge 5 has the rake angle which is not zero, drilling conditions for drilling a metal can be made preferable. Therefore, when improving quality of a hole machined on a metal is considered as important, each tip cutting edge 5 may has the rake angle which is not zero. In an illustrated example, the rake angle of each tip cutting edge 5 is 0°. That is, the rake angle is not formed on each tip cutting edge 5.

On the other hand, each reamer cutting edge 6 may also have such a shape that a point angle β continuously decreases down to 0° and a relief angle γ2 continuously decreases from the tip side of the tool axis AX direction and the drill 1 toward the rear end side. Therefore, the diameter of the reamer cutting edges 6 also continuously increases from the tip side toward the rear end side. As a result, the point angle β becomes 0° at the maximum diameter position of the reamer cutting edges 6. That is, each reamer cutting edge 6 has the non-zero relief angle γ2 at the maximum diameter position at which the point angle β becomes 0°.

The maximum diameter of the reamer cutting edges 6 in the rear end side is larger than the maximum diameter of the tip cutting edges 5. Therefore, the maximum diameter of the reamer cutting edges 6 is the tool diameter D of the drill 1. The maximum diameter of the holding part 7 is made not more than the maximum diameter of the tip cutting edges 5.

Therefore, when a workpiece is machined by the tip cutting edges 5 of which maximum diameter is smaller than the tool diameter D, a prepared hole having a diameter smaller than that of a finished hole to be machined is machined on the workpiece. Accordingly, the tip cutting edges 5 undertake a role of drilling a prepared hole on a workpiece.

When the drill 1 is fed out in the tool axis AX direction while drilling a workpiece, the holding part 7 is inserted into the prepared hole machined by the tip cutting edges 5 since the maximum diameter of the holding part 7 following the tip cutting edges 5 is not more than the maximum diameter of the tip cutting edges 5. Accordingly, the outer surface having the maximum diameter of the holding part 7 contacts the inner surface of the prepared hole, and thereby the holding part 7 is guided by the prepared hole.

As a result, deflection of the holding part 7 and the reamer cutting edges 6 following the holding part 7 can be reduced during drilling. That is, the holding part 7 functions as a deflection stopping part which reduces deflection of the reamer cutting edges 6 by being inserted into a prepared hole machined by the tip cutting edges 5 during drilling a workpiece.

It is practical to form the holding part 7 by margins 7A each having an appropriate width, and not to form any cutting edge in the holding part 7, from a viewpoint of letting the holding part 7 fulfill a function as a deflection stopper of the reamer cutting edges 6 while avoiding an excessive rise in temperature due to friction between a workpiece and the holding part 7. When the holding part 7 is formed by the margins 7A having no cutting edges, the margins 7A can be formed so that the tip cutting edges 5 are connected with the reamer cutting edges 6 by the margins 7A respectively.

The width of each margin 7A included in the holding part 7 can be determined to an appropriate width according to the maximum diameter of the tip cutting edges 5 equivalent to the diameter of a prepared hole. As a concrete example, when the maximum diameter of the tip cutting edges 5 is about 3 mm to 10 mm, the width of each margin 7A can be determined within a range of 0.1 mm to 1.5 mm, e.g., to about 0.3 mm.

When the drill 1 is further fed out in the tool axis AX direction while drilling the workpiece, the prepared hole is reamed by the reamer cutting edges 6 formed at positions away, in the rear end side, from the tip cutting edges 5. Specifically, hole-finish processing for extending the inside diameter of the prepared hole, machined on the workpiece, up to the tool diameter D equivalent to the maximum diameter of the reamer cutting edges 6 can be performed. Thereby, a hole having a diameter corresponding to the tool diameter D can be machined on the workpiece.

Note that, although "a reamer cutting edge" may mean a cutting edge, having a specific shape for finishing a hole, formed on the lateral face of a tool, in a narrow sense, "a reamer cutting edge" is used in a broad sense here, and a cutting edge for finishing a hole is written as "a reamer cutting edge" regardless of the shape of the cutting edge. Therefore, "reaming" is also used in a broad sense here, and finishing a hole is written as "reaming" regardless of the shape of a cutting edge for finishing of a hole.

As exemplified by FIG. 5, when the ridgelines of the reamer cutting edges 6 are determined so that the ridgelines of the reamer cutting edges 6 and the ridgelines of the tip cutting edges 5 on a projection plane parallel to the tool axis AX may lie on the reference line RL consisting of a common quadratic curve or common quadratic curves, such as an ellipse, ellipse, a parabola or parabolas, the drill 1 can be produced by a production method by which a semi-product of the drill 1 whose ridgelines of the reamer cutting edges 6 have been connected with the ridgelines of the tip cutting edges 5 respectively is produced, and subsequently the holding part 7 is formed by cutting or polishing process.

In this case, steps are generated in the tip side of the reamer cutting edges 6 just by forming the holding part 7 on a semi-product of the drill 1 having cutting edges along the reference line RL consisting of at least one quadratic curve. That is, the tool diameter of the drill 1 increases stepwise at the tip of the reamer cutting edges 6. As a result of tests, it was confirmed that steps in the tip side of the reamer cutting edges 6 allowed reaming an FRP under a satisfactory condition while the steps in the tip side of the reamer cutting edges 6 made it difficult to ream a metal under a satisfactory condition.

Accordingly, when a hole is made machinable with satisfactory quality not only on an FRP but also on a metal, it is appropriate to form cutting edges, having the largest and constant point angle $\beta$, at the tip of the reamer cutting edges 6, and connect the cutting edges, of which point angle $\beta$ and each relief angle $\gamma 2$ decrease continuously, with the rear side of the cutting edges having the constant point angle $\beta$ as illustrated. As a result of tests, it was confirmed that it is preferable to make the largest point angle $\beta$ in the tip side of the reamer cutting edges 6 not less than 80° and not more than 100° when a hole is made machinable with satisfactory quality not only on an FRP but also on a metal.

Note that, when the drill 1 is dedicated for drilling an FRP, the cutting edges having the constant point angle $\beta$ may not be formed in the tip side of the reamer cutting edges 6 so that steps may be formed since the point angle $\beta$ of not less than 80° and not more than 100° is not necessarily required for reaming an FRP. In that case, the largest point angle $\beta$ in the tip side of the reamer cutting edges 6 is the maximum of the point angle $\beta$ which decreases continuously.

Regardless of whether the cutting edges having the constant point angle $\beta$ are formed in the tip side of the reamer cutting edges 6, the point angle $\beta$ in the rear end side of the reamer cutting edges 6 is made 0° as mentioned above. Since any parabola has no tangent line parallel to the symmetrical axis, it is convenient to determine a shape of the ridgelines of the reamer cutting edges 6 so that a projected line of the ridgeline of the whole reamer cutting edge 6 or a projected line of at least a part of the ridgeline of the reamer cutting edge 6 in the rear end side may become a portion of an ellipse which crosses a short axis, in order to make the point angle $\beta$ in the rear end side of the reamer cutting edges 6 be 0°.

Therefore, when the respective shapes of the ridgelines of the tip cutting edges 5 and the ridgelines of the reamer cutting edges 6 are determined so that the ridgelines of portions other than the tip, of the tip cutting edges 5 and the ridgelines of the reamer cutting edges 6 on a projection plane parallel to the tool axis AX may lie on circles which simulates the reference line RL consisting of a common ellipse or common ellipses, it becomes possible to reduce labor and costs for manufacturing the drill 1 whose point angle $\beta$ in the rear end side of the reamer cutting edges 6 is 0°, by adopting a production method by which a semi-product of the drill 1 whose ridgelines of the tip cutting edges 5 have been connected with the ridgelines of the reamer cutting edges 6 respectively is produced, and subsequently the holding part 7 is formed by cutting work or polishing processing.

When the non-zero relief angle $\gamma 2$ is formed at the maximum diameter position at which the point angle $\beta$ of the reamer cutting edges 6 becomes 0°, reaming can be performed without generating burrs since the reamer cutting edges 6 at the maximum diameter position contact in parallel with the inner surface of the prepared hole machined by the tip cutting edges 5. As a result, a finished hole can be machined on a workpiece with satisfactory quality.

Note that, it is desirable to make the relief angle $\gamma 2$ of each reamer cutting edge 6 at the maximum diameter position or the reamer cutting edges 6 be less than 15° from a viewpoint of preventing chipping and wear of the reamer cutting edges 6. Therefore, the maximum relief angle of each of the cutting edges having the constant point angle $\beta$ in the tip side of the reamer cutting edges 6 can be made about 11° to 12° while the minimum relief angle $\gamma 2$ of each reamer cutting edge 6 at the maximum diameter position of the reamer cutting edges 6 can be made about 10°, for example. Meanwhile, a rake angle of each reamer cutting edge 6 can be formed at 0° or an appropriate angle, similarly to the tip cutting edge 5.

A margin 10 can be formed in the rear end side of each reamer cutting edge 6 so that the margin 10 continues from the reamer cutting edge 6 as exemplified by FIG. 1, FIG. 3 and FIG. 4. Thereby, the body 2 of the drill 1 can be guided by a hole, which has been finished by the reamer cutting edges 6, so that deflection of the drill 1 can be reduced. The width of each margin 10 can be determined as an appropriate width according to the tool diameter D. As a concrete example, when the tool diameter D is about 3 mm to 10 mm, the width of each margin 10 can be determined within a range of 0.1 mm to 1.5 mm, e.g., to about 0.3 mm.

When the margins 7A are formed in the holding part 7 while the margins 10 are also formed behind the cutting edge part 4, the margins 7A in the holding part 7 can be guided by a prepared hole while the margins 10 behind the reamer cutting edges 6 can be guided by a finished hole. That is, deflection of the reamer cutting edges 6 can be suppressed at two positions in the tool axis AX direction which sandwich the reamer cutting edges 6. As a result, off-centering of the drill 1 in the portion of the reamer cutting edges 6 can be prevented, and thereby a finished hole can be machined with satisfactory quality.

The margins 7A formed in the holding part 7 may have a constant diameter or may have a back taper. When the diameter of the holding part 7 is made constant with no back taper, the effect of reducing deflection of the holding part 7 can be maximized since the whole margins 7A of the holding part 7 are contacted with the inner surface of a prepared hole.

When the whole margins 7A of the holding part 7 are contacted with the inner surface of a prepared hole, the possibility that temperature of a workpiece may rise due to frictional heat between the margins 7A and the workpiece becomes high. Accordingly, when a workpiece is made of a material, such as aluminum, of which melting point is low, the workpiece may be welded. Thus, when a workpiece made of a material, such as aluminum, having a low melting point is drilled, welding of the workpiece can be prevented by forming a back taper on the margins 7A of the holding part 7.

On the contrary, when a hard-to-cut material, such as titanium or an FRP, having low thermal conductivity is drilled, an effect of reduction in deflection of the holding part 7 may be improved by omitting a back taper or forming a small back taper on the margins 7A of the holding part 7 since cutting resistance becomes large and the hard-to-cut material is hard to be welded.

As a result of tests, it became clear that it was appropriate to form a back taper of not less than 0.02/100 and not more than 0.06/100 on the holding part 7 in order to achieve both preventing welding of a workpiece and preventing deflection of the holding part 7 as long as the back taper was formed. In view of the same reason, it is also appropriate to omit a back taper or form a back taper of not less than 0.02/100 and not more than 0.06/100 on the margins 10 formed behind the cutting edge part 4.

When the maximum diameter of the holding part 7 is made too small, the maximum diameter of the tip cutting edges 5 also becomes small, by which the rigidity of the tip cutting edges 5 and the holding part 7 deteriorates, and the amount of depth of cut in finish processing by the reamer cutting edges 6 may be excessive. Accordingly, it is important to secure rigidity of the tip cutting edges 5 and the holding part 7 while making the amount of depth of cut in finish processing by the reamer cutting edges 6 appropriate in order to machine a hole with high quality. As a result of tests, it became clear that it was desirable to make the maximum diameter of the holding part 7 be not less than 0.5 times and not more than 0.9 times of the tool diameter D equivalent to the maximum diameter of the reamer cutting edges 6.

The length Lh of the holding part 7 in the tool axis AX direction can be determined based on the cutting edge length L and the length L2 appropriate for the reamer cutting edges 6. The cutting edge length L is expressed as the sum of the length L1 of the tip cutting edges 5 in the tool axis AX direction, the length Lh of the holding part 7 in the tool axis AX direction, and the length L2 from the minimum diameter position of the reamer cutting edges 6 to the position, at which the diameter of the reamer cutting edges 6 firstly becomes the maximum, in the tool axis AX direction.

Specifically, a condition for determining shapes of the ridgelines of the tip cutting edges 5 and the reamer cutting edges 6 along a preferable quadratic curve or preferable quadratic curves while determining the point angle α of the tip cutting edges 5 as an appropriate angle is that the cutting edge length L expressed as the sum of the length L1 of the tip cutting edges 5 in the tool axis AX direction, the length Lh of the holding part 7 in the tool axis AX direction and the length L2 from the minimum diameter position of the reamer cutting edges 6 to the position, at which the diameter of the reamer cutting edges 6 firstly becomes the maximum, in the tool axis AX direction is made not less than one time and not more than twice of the maximum diameter of the reamer cutting edges 6 equivalent to the tool diameter D (i.e., $1D \leq L \leq 2D$). This is because a too short cutting edge length L compared with the tool diameter D geometrically necessitates to enlarge the point angle α or to approximate the projected lines of the tip cutting edges 5 and the reamer cutting edges 6 to an arc, an ellipse whose short axis is parallel to the tool axis AX, or the like, which is unfavorable.

Therefore, the cutting edge length L of the whole drill 1 is determined depending on the tool diameter D. Accordingly, when the maximum diameter of the holding part 7 is determined depending on the tool diameter D, the length L1 of the tip cutting edges 5 is inevitably determined since the radius of rotation of the tip cutting edges 5 is determined on the basis of the reference line RL which consists of a quadratic curve or quadratic curves, such as a parabola, parabolas, an ellipse or ellipses. Therefore, the length derived by subtracting the length L1 of the tip cutting edges 5 from the cutting edge length L of the whole drill 1 becomes the sum of the length Lh of the holding part 7 and the length L2 of the reamer cutting edges 6. Accordingly, the length derived by subtracting the length L2 appropriate as the reamer cutting edges 6 can be determined as the length Lh of the holding part 7.

As a concrete example, the length L2 of the reamer cutting edges 6 can be set to 0.1 times the tool diameter D (i.e., L2=0.1D) while the sum of the length L1 of the tip cutting edges 5 and the length Lh of the holding part 7 can be set to 1.5 times the tool diameter D (i.e., L1+Lh=1.5D).

Note that, the length of the margins 7A required to let the holding part 7 fulfill the function to stop deflection may become shorter than the length Lh of the holding part 7. Moreover, when a contact area between the margins 7A and a prepared hole machined by the tip cutting edges 5 is too large, temperature may increase excessively.

For that reason, a back taper may be formed partially instead of forming a back taper over the whole holding part 7, or a portion having a constant diameter may be formed partially. Experientially, it is considered that making the diameter or the back taper constant in a range whose length is at least ⅕ of the length of the holding part 7 in the tool axis AX direction ($\geq$Lh/5) makes it possible to obtain the effect of stopping deflection of the reamer cutting edges 6 sufficiently. That is, it is considered that the effect of reduction in deflection of the reamer cutting edges 6 can be attained so long as the margins 7A having the constant maximum diameter or the constant back taper are formed in the range having at least ⅕ length in the tip cutting edge 5 side of the holding part 7.

Figure 7:
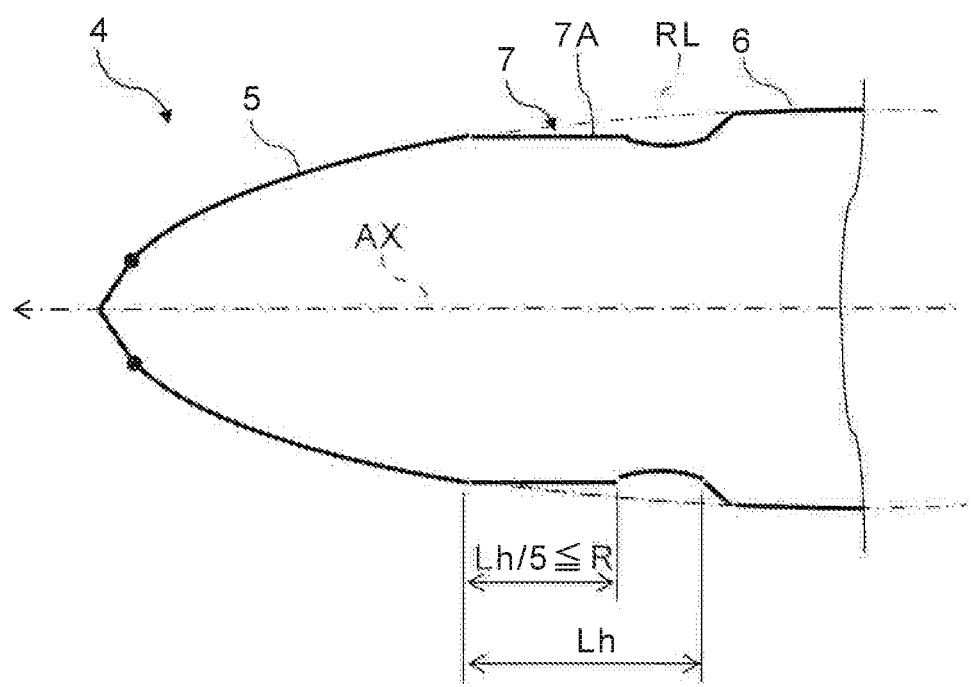
FIG. 7 is a projection view showing an example of the margins formed only within a partial range of the hold part shown in FIG. 1.

FIG. 7 is a projection view showing an example of the margins 7A formed only within a partial range R of the hold part 7 shown in FIG. 1.

As shown by the projection view in FIG. 7, it is a preferred condition to form the margins 7A in the range R whose length is not less than 20% and not more than 100% of the length Lh of the holding part 7. In other words, the margins 7A may be formed only in the partial range R of the holding part 7 while the radius of rotation may be decreased in the remaining range. Therefore, when the margins 7A are formed by polishing only a certain range R may be polished with high accuracy to form the margins 7A while a back clearance may be formed in the other range by rough polish processing.

Method of Producing Drilled Product

Figure 8:
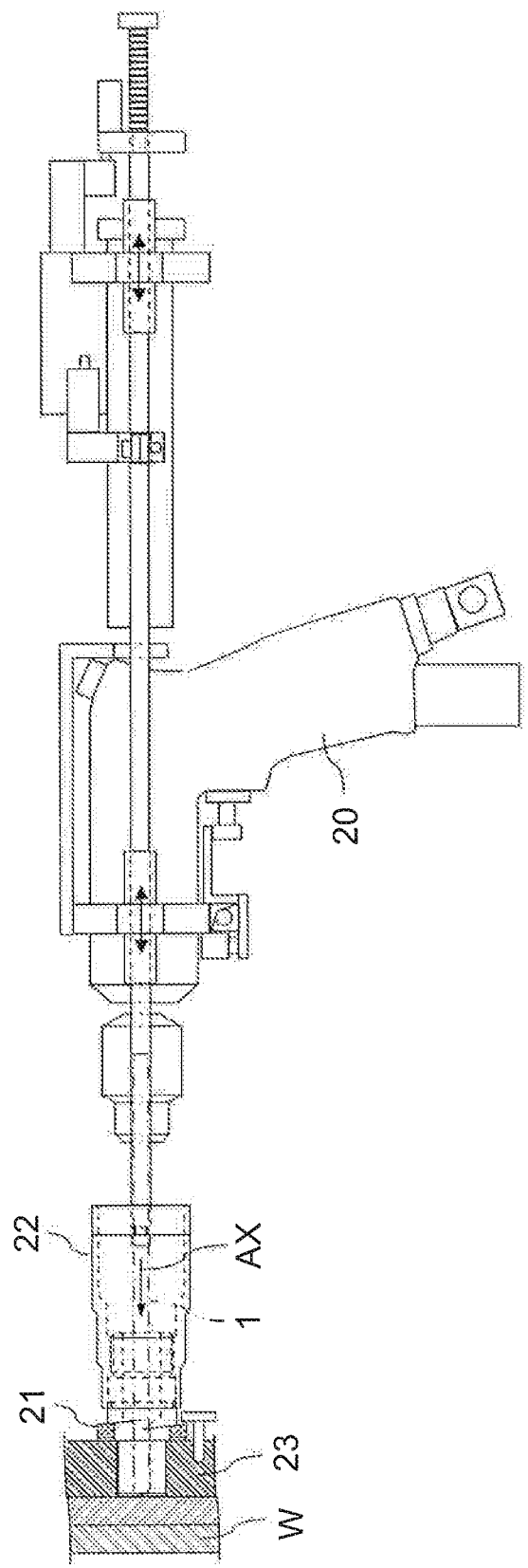
FIG. 8 is a view for explaining an example of a method of drilling a workpiece by attaching the drill to a handheld tool rotating device.

FIG. 8 is a view for explaining an example of a method of drilling a workpiece W by attaching the drill 1 to a handheld tool rotating device 20.

A drilled product can be produced as a product or a semi-product by drilling the workpiece W using the drill 1 held by the handheld tool rotating device 20 as shown in FIG. 8. When the workpiece W is drilled by the handheld tool rotating device 20, the drill 1 can be positioned to the workpiece W by attaching a nosepiece 22 having a bushing chip 21 to the tool rotating device 20 while placing a drill plate 23 on the workpiece W.

Specifically, the position and direction of the drill 1 can be positioned by fixing the bushing chip 21 to the drill plate 23. Then, not only the workpiece W made of a single material, such as an FRP or a metal, but also the workpiece W made of materials, such as overlapped materials of an FRP and a metal, can be drilled using the drill 1, for example.

Although the tool rotating device 20 in an example shown in FIG. 8 has an automatic feeding function of the drill 1, the workpiece W may be drilled by the simple tool rotating device 20 having only a rotation function of the drill 1. As a matter of course, a drilled product may be produced by attaching the drill 1 to a machine tool, such as a drill press or a machining center, or a drilling machine which is not handheld.

Effects

As described above, the drill 1 has the tip cutting edges 5 each having the continuously decreasing point angle α and relief angle γ1, the reamer cutting edges 6 each having the continuously decreasing point angle β and relief angle γ2 which does not becomes zero at the maximum diameter position at which the point angle β becomes 0°, and the hold part 7 consisting of the margins 7A and the like, for reducing deflection of the reamer cutting edges 6, between the tip cutting edges 5 and the reamer cutting edges 6. Meanwhile, a method of producing a drilled product is to produce the drilled product using the above-mentioned drill 1.

Accordingly, the drill 1 and the method of producing a drilled product allow reaming of a prepared hole drilled by the tip cutting edges 5, by the reamer cutting edges 6 while being guided with the holding part 7 by utilizing the prepared hole. That is, vibration of the reamer cutting edges 6 can be suppressed by the holding part 7. Therefore, a hole having circular cross section can be machined with high quality.

In particular, there was a problem that a hole drilled by a drilling device whose spindle had low rigidity or accuracy unfavorably became a polygon in a case where the number of cutting edges of the conventional R-drill (registered trademark), of which point angle and relief angle of each cutting edge continuously changed toward the maximum diameter position of the cutting edges and the relief angle at the maximum diameter position of the cutting edges was nonzero, was not less than three. It is considered that this conventional problem is because the coaxiality of the tool axis of the R-drill (registered trademark) cannot be secured, and thereby the R-drill (registered trademark) is deflected when the rigidity or accuracy of a spindle of a drilling device holding the R-drill (registered trademark) is low. Specifically, it is considered that a hole unfavorably becomes a polygon since the cutting edges in the lateral side of the R-drill (registered trademark) contact with the inner surface of the hole while vibrating.

On the other hand, the above-mentioned drill 1 derived by improving the R-drill (registered trademark) is used, a finished hole having a circular cross section can be machined by finish processing of a prepared hole by the reamer cutting edges 6 of which deflection has been suppressed by the holding part 7 even when the shape of the cross section of the prepared hole drilled by the tip cutting edges 5 becomes a polygon due to the deflection of the tip cutting edges 5. Accordingly, a hole can be machined with satisfactory quality even when the number of the tip cutting edges 5 is made not less than three.

That is, even under drilling conditions under which the shape of the cross section of a hole unfavorably becomes a polygonal using the conventional R-drill (registered trademark) having at least three cutting edges, the above-mentioned drill 1 can machine a hole having a circular cross section. As a concrete example, even when the workpiece W is drilled by the drill 1 having not less than three cutting edges, which is held by the handheld tool rotating device 20 as exemplified in FIG. 8, a hole of which cross section has a circular shape can be machined. That is, drilling can be manually performed by the drill 1 having not less than three cutting edges.

When the number of the tip cutting edges 5 and the reamer cutting edges 6 of the drill 1 is increased, the cutting amount per one cutting edge of the tip cutting edges 5 and the reamer cutting edges 6 is decreased. Therefore, when the number of the tip cutting edges 5 and the reamer cutting edges 6 of the drill 1 is made not less than three, a tool life, i.e., the number of holes which can be drilled with securing quality can be increased compared with the conventional R-drill (registered trademark) having two cutting edges.

Moreover, also in a case where the number of the tip cutting edges 5 and the reamer cutting edges 6 is two, the quality of a hole can be improved since the vibration in the tool diameter D direction can be suppressed compared with the conventional R-drill (registered trademark) having two cutting edges. In particular, since metal chips are finely cut as a result of restricting the drill 1 to vibrate only in the tool axis AX direction, an effect that clogging with metal chips can be prevented is also obtained. That is, the vibration energy in the tool diameter D direction of the drill 1 can be transformed into the vibration energy in the thrust direction by the holding part 7, and thereby the energy can be utilized for preventing clogging with metal chips.

Second Implementation

Figure 9:
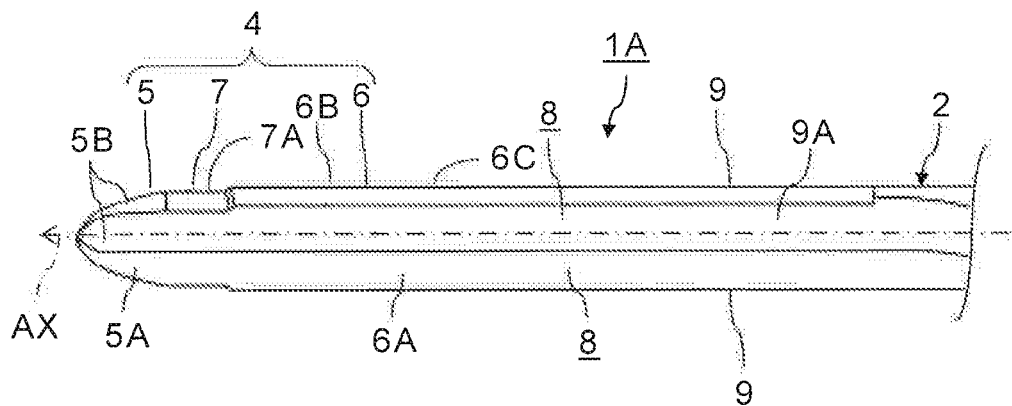
FIG. 9 is a partial front view of a drill according to the second implementation of the present invention.

FIG. 9 is a partial front view of a drill according to the second implementation of the present invention. Note that, the lower side than the tool axis AX in FIG. 9 shows the outline of the outer shape of a cutting edge of the drill when the rake face of the cutting edge is developed so that the rake face may be parallel to the figure, and illustration of the detailed outline of the inner shape of the cutting edge has been omitted since the cutting edges formed in the drill are symmetric with each other around the tool axis AX, i.e., the shapes of the cutting edges formed in the drill are the same.

A drill 1A in the second implementation shown in FIG. 9 is different from the drill 1 in the first implementation in a point that a portion 6C having the constant maximum diameter is extended in the rear end side of the reamer cutting edges 6. Other structures and actions of the drill 1A in the second implementation are not substantially different from those of the drill 1 in the first implementation. Therefore, only a partial front view of the drill 1A is shown, and the same signs are attached to the same elements or the corresponding elements while explanation thereof is omitted.

As explained in the first implementation, deflection of the reamer cutting edges 6 is suppressed by the margins 7A of the holding part 7. Accordingly, the margins 10 in the rear side of the reamer cutting edges 6 may be omitted while the portion 6C which has the constant maximum diameter can be formed instead. Alternatively, the portion 6C which has the constant maximum diameter may be formed, and the margins 10 may be formed in the rear side of the portion 6C. Anyway, the portion 6C, of which point angle β is 0°, having non-zero relief angle γ2 can be lengthened.

In this case, even when the reamer cutting edges 6 are worn out and thereby a radius of rotation is decreased, it becomes possible to perform finish processing of a hole with the reamer cutting edges 6 at the new maximum diameter position since the maximum diameter position merely moves toward the rear side of the reamer cutting edges 6. As a result, a tool life of the drill 1A can be lengthened. Moreover, a deep hole can also be machined by lengthening the portion 6C which has the constant maximum diameter. In particular, an effect of improving the quality of a deep hole can be attained when the deep hole is machined on a workpiece which has the thickness not less than 2.6 times the tool diameter.

Third Implementation

Figure 10:
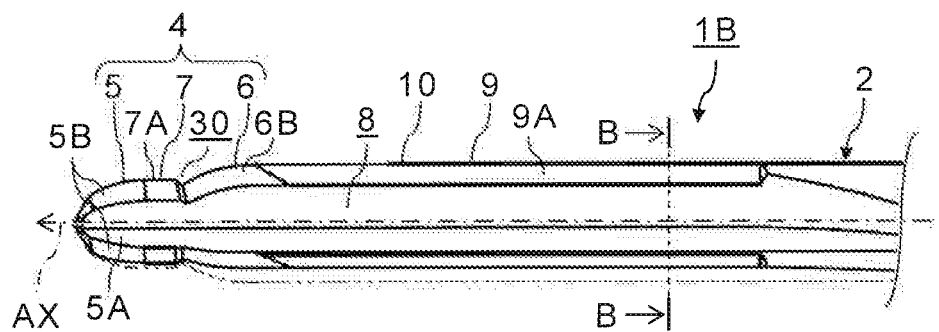
FIG. 10 is a partial front view of a drill according to the third implementation of the present invention.
Figure 11:
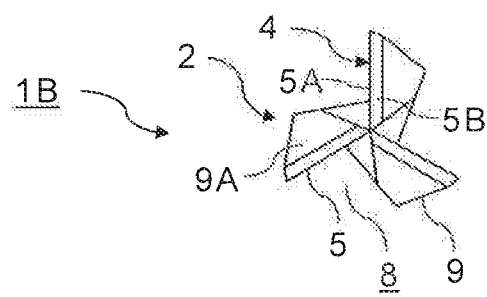
FIG. 11 is an enlarged left side view of the tip pact of the drill shown in FIG. 10.
Figure 12:
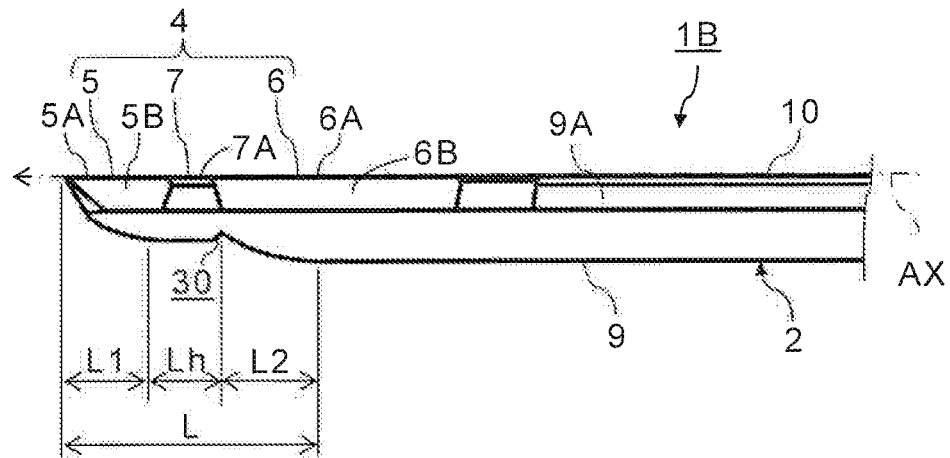
FIG. 12 is an enlarged partial top view of the tip part of the drill shown in FIG. 10;
"
Figure 13:
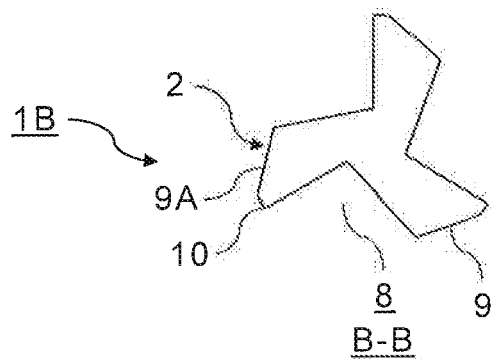
FIG. 13 is an enlarged cross-sectional view at the position B-B of the drill shown in FIG. 10.
Figure 14:
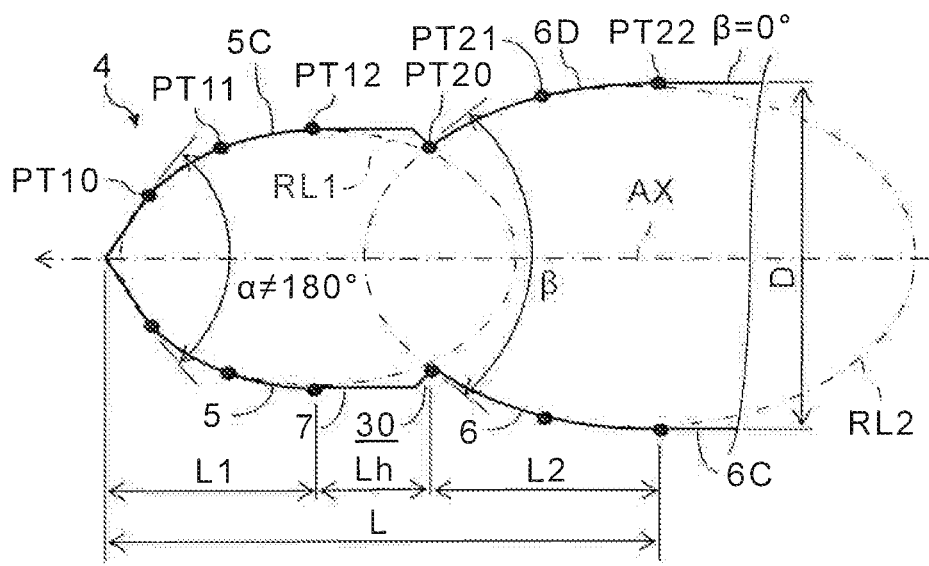
FIG. 14 is an enlarged projection view of the tip part of the drill shown in FIG. 10.

FIG. 10 is a partial front view of a drill according to the third implementation of the present invention. FIG. 11 is an enlarged left side view of the tip part of the drill shown in FIG. 10. FIG. 12 is an enlarged partial top view of the tip part of the drill shown in FIG. 10. FIG. 13 is an enlarged cross-sectional view at the position B-B of the drill shown in FIG. 10. FIG. 14 is an enlarged projection view of the tip part of the drill shown in FIG. 10.

A drill 1B in the third implementation shown in FIG. 10 to FIG. 14 is different from each of the drill 1 in the first implementation and the drill 1A in the second implementation in a point that the point angle of the reamer cutting edges 6 continuously changes so that any step may not be generated in the tip side of the reamer cutting edges 6. Other structures and actions of the drill 1B in the third implementation are not substantially different from those of each of the drill 1 in the first implementation and the drill 1A in the second implementation. Therefore, the same signs are attached to the same elements or the corresponding elements while explanation thereof is omitted.

As shown in FIG. 10 to FIG. 14, the point angle $\beta$ of the reamer cutting edges 6 can be smoothly and continuously decreased down to 0° from the tip side of the drill 1 and the tool axis AX direction toward the rear side so that any portion at which the point angle $\beta$ of the reamer cutting edges 6 changes intermittently toward the tool axis AX direction may not be generated. In addition, the non-zero relief angle $\gamma 2$ can be formed at the maximum diameter position of the reamer cutting edges 6 where the point angle $\beta$ of the reamer cutting edges 6 becomes 0°, as exemplified by FIG. 14, similarly to the first implementation. In this case, it is also practical to smoothly and continuously decrease the relief angle $\gamma 2$ of the reamer cutting edges 6 from the tip side of the drill 1 and the tool axis AX direction toward the rear side so that any portion at which the relief angle $\gamma 2$ of the reamer cutting edges 6 changes intermittently may not generated, similarly to the point angle $\beta$.

The portion 6C having the constant maximum diameter may be extended in the rear end side of the maximum diameter position of the reamer cutting edges 6 where the point angle $\beta$ has decreased down to 0°, as described in the second implementation. The margin 10 can be extended in the rear end side of the reamer cutting edge 6 itself, as described in the first implementation, regardless of whether the portion 6C having the constant maximum diameter is extended.

The number of the tip cutting edges 5 and the reamer cutting edges 6 is flexible and not limited to a case of three cutting edges as exemplified by FIG. 11 and FIG. 13. When the number of the tip cutting edges 5 and the reamer cutting edges 6 is increased, the effect that the tool life of the drill 1B and the number of holes, which can be drilled, can be increased can be attained since the cutting amount per one cutting edge of the tip cutting edges 5 and the reamer cutting edges 6 decreases, as described in the first implementation. Moreover, the drill 1B is not limited to a straight fluted drill having the untwisted grooves 8, and may be a twist drill having the twisted grooves 8, similarly to the first implementation.

When the point angle $\beta$ of the reamer cutting edges 6 is decreased smoothly so that two point angles $\beta$ may not be generated at any position of the ridgelines of the reamer cutting edges 6 as shown in FIG. 10 and FIG. 14, the effect similar to the effect attained in the case where the point angle $\alpha$ of the tip cutting edges 5 is decreased smoothly and continuously can be attained in the case of reaming a prepared hole by the reamer cutting edges 6.

More specifically, when the point angle $\beta$ of the reamer cutting edges 6 is decreased continuously, an effect that the risk of chipping can be reduced can be attained since no corner which may cause chipping is generated on the ridgeline of each reamer cutting edge 6. As a result, the tool life of the drill 1B can be increased. In addition, when the point angle $\beta$ of the reamer cutting edges 6 is decreased gradually, an effect that generation of delamination can be reduced in case of drilling an FRP can be attained. This is because delamination temporarily generated due to reaming an FRP by the reamer cutting edges 6, having the relatively large point angle $\beta$, in the tip side of the drill 1B is removed by reaming by the reamer cutting edges 6, having the relatively small point angle $\beta$, continuing to the rear side because of small cutting resistance.

Moreover, the more a shape of the ridgelines of the reamer cutting edges 6 on a projection plane parallel to the tool axis AX is approximated to a parabola, the more the volume of a workpiece cut by the ridgelines per unit length in the tool axis AX direction becomes uniform. Therefore, an effect that cutting resistance can be made uniform over the whole reamer cutting edges 6 can be attained. When cutting resistance can be made uniform over the whole reamer cutting edges 6, it becomes possible to reduce not only the generation of delamination and burrs at the time of reaming an FRP but also wear of the reamer cutting edges 6.

Meanwhile, when a shape of the ridgelines of the reamer cutting edges 6 on a projection plane parallel to the tool axis AX is approximated to an ellipse, the volume of a workpiece cut by the ridgelines per unit length in the tool axis AX direction can be decreased at a constant rate as the ridgelines are located in the rearer side of the reamer cutting edges 6. Therefore, the situation that the wear in posterior portions of the reamer cutting edges 6, of which a cutting speed is relatively fast due to different radii of rotation, progresses earlier than the wear in anterior portions of the reamer cutting edges 6, of which a cutting speed is relatively slow, can be avoided, and thereby an effect that the degree of progress of the wear can be made uniform over the whole reamer cutting edges 6 can be attained. When the degree of progress of the wear can be made uniform over the whole reamer cutting edges 6, the life of the reamer cutting edges 6 can be improved.

Therefore, the shape of the ridgelines of the reamer cutting edges 6 on a projection plane can be approximated to a parabola or an ellipse depending on an effect which is thought as important. As a matter of course, the shape of the ridgelines of the reamer cutting edges 6 on a projection plane may be determined so that a part may have a shape close to an ellipse while another part may have a shape close to a parabola. Production of the reamer cutting edges 6 of which at least a part of the outline on a projection plane resides on an ellipse or a parabola is complicated. Therefore, an ellipse or a parabola may be simulated by smoothly connecting line segments and/or circular arcs to each other so that no corner may be generated.

When the point angle $\beta$ of the reamer cutting edges 6 is decreased continuously so that no corner may be generated while the shape of the reamer cutting edges 6 on a projection plane parallel to the tool axis AX is determined to a shape simulating an ellipse or a parabola with line segments and/or arcs as mentioned above, the ridgelines of the tip cutting edges 5 and the reamer cutting edges 6 respectively become ridgelines simulating reference lines RL1 and RL2 different from each other, as exemplified by FIG. 14.

More specifically, the shape of the projected line 5C derived by projecting a passing area of the tip cutting edges 5, rotated around the tool axis AX, on a projection plain parallel to the tool axis AX becomes a shape, derived by connecting the first circular arcs and/or line segments with each other, which is line symmetric around a straight line derived by projecting the tool axis AX on the projection plane. As a concrete example, the first circular arcs and line segments can be determined so that at least six points PT10, PT11, and PT12 on the projected line 5C derived by connecting the first circular arcs and line segments with each other may be on the first reference line RL1 consisting of the first quadratic curve, as shown in FIG. 14.

The first quadratic curve used as the first reference line RL1 can be determined as any one of a single parabola, two parabolas, a single ellipse or two ellipses, line symmetric around a straight line derived by projecting the tool axis AX on the projection plane, as described in the first implementation. FIG. 14 shows an example in which the first reference line RL1 is a single ellipse.

Meanwhile, the shape of the projected lines 6D derived by projecting a passing area of the reamer cutting edges 6, rotated around the tool axis AX, on a projection plain parallel to the tool axis AX becomes a shape, derived by connecting the second circular arcs and/or line segments with each other, which is line symmetric around a straight line derived by projecting the tool axis AX on the projection plane. As a concrete example, the second circular arcs and line segments can be determined so that at least six points PT20, PT21, and PT22 on the two projected lines 6D derived by connecting the second circular arcs and line segments with each other may be on the second reference line RL2 consisting of the second quadratic curve, as shown in FIG. 14.

The second quadratic curve used as the second reference line RL2 can be determined as any one of a single parabola, two parabolas, a single ellipse or two ellipses, line symmetric around a straight line derived by projecting the tool axis AX on the projection plane and different form the first quadratic curve used as the first reference line RL1. FIG. 14 shows an example in which the second reference line RL2 is a single ellipse.

As a matter of course, the shape of at least a part of at least one of the tip cutting edges 5 and the reamer cutting edges 5 on a projection plane may be a quadratic curve itself or quadratic curves themselves consisting of a single ellipse, two ellipses, a single parabola or two parabolas, serving as the reference, instead of simulating a single quadratic curve or two quadratic curves. That is, the shape of at least a part of the tip cutting edges 5 and the reamer cutting edges 6 may be overlapped with the reference line RL1 and/or the reference line RL2.

Note that, when the shape of the projected line 5C of the tip cutting edges 5 is determined by using a single ellipse or parabola as the first reference line RL1, the projected line 5C of the tip cutting edges 5 near the tip of which point angle α becomes the maximum cannot be overlapped with the single ellipse or parabola since the largest point angle α at the tip must not be 180°. For that reason, it is practical to make the shape of the projected line 5C of the tip cutting edges 5 near the tip of which point angle α becomes the maximum be two line segments connected so as to become line symmetric with respect to the tool axis AX, from a viewpoint of simplifying production. Also in case of simulating the first reference line RL1 by connecting arcs as exemplified by FIG. 14, or in case of using two quadratic curves, line symmetric with respect to the tool axis AX, as the first reference line RL1, it is practical to make the shape of the projected line 5C of the tip cutting edges 5 near the tip of which point angle α becomes the maximum be two line segments connected so as to become line symmetric with respect to the tool axis AX, from a viewpoint of simplifying production.

On the other hand, the reamer cutting edges 6 are away from each other at the position where the point angle β becomes the maximum, unlike the tip cutting edges 5. Therefore, each of the shapes of the portions of the projected lines 6D of which point angle β decreases, including the portions of the projected lines 6D at which point angle β becomes the maximum, can be simulated with circular arcs or overlapped with the second reference lines RL 2 regardless of whether the second reference line RL2 consists of a single quadratic curve or two quadratic curves line symmetric with respect to the tool axis AX. When the portions 6C of which point angle β is constantly 0° are formed, the shapes of the projected lines 6D of the portions 6C of which point angle β is 0° each becomes a line segment, as exemplified by FIG. 14.

The portion whose length is L2, at which the point angle β of the reamer cutting edges 6 changes, from the position, at which the diameter of the reamer cutting edges 6 becomes the minimum, to the position, at which the diameter of the reamer cutting edges 6 firstly becomes the maximum, which corresponds to the projected lines 6D of the portion of the reamer cutting edges 6 from the position, at which the point angle β of the reamer cutting edges 6 becomes the maximum, to the position, at which the point angle β of the reamer cutting edges 6 firstly becomes 0°, had better not be simulated with line segments from the viewpoint of increasing the degree of coincidence with the second reference line RL2 consisting of a single quadratic curve or two quadratic curves. Accordingly, when the second reference line RL2 is simulated, it is preferable to simulate the second reference line RL2 by connecting only circular arcs without line segments, as exemplified by FIG. 14.

Therefore, a preferable condition for improving drilling quality and the tool life is to make the shape of each of the projected lines 6D derived by projecting a passing area of the portion of the reamer cutting edges 6 having the length L2, at which the point angle β of the reamer cutting edges 6 changes, rotated around the tool axis AX, on a projection plain parallel to the tool axis AX be a part of a quadratic curve or quadratic curves, regardless of whether the shape of each of the projected lines 6D is made to be circular arcs simulating the second quadratic curve or a part of the second quadratic curve itself, since a circular arc is a part of a circle which is also a quadratic curve.

Note that, in the third implementation in which the point angle β of the reamer cutting edges 6 does not change intermittently, there are no common points between the projected line 5C derived by projecting the passing area of the tip cutting edges 5, rotated around the tool axis AX, on a projection plain, and a quadratic curve or quadratic curves of which a part is the projected lines 6D of the reamer cutting edges 6 (i.e., circles for simulating the second reference RL2, circles for simulating the two second reference lines RL2, the second reference line RL2 itself or the two second reference lines RL2 themselves) even if the quadratic curve or the quadratic curves forming the projected lines 6D are extended infinitely in the length direction, as exemplified by FIG. 14, whereas a quadratic curve or two quadratic curves used as the reference line RL for the projected lines of the reamer cutting edges 6 in the first implementation in which the point angle β of the reamer cutting edges 6 may change intermittently may be common to a quadratic curve or two quadratic curves used as the reference line RL for the projected line of the tip cutting edges 5, as exemplified by FIG. 5.

By the way, each reamer cutting edge 6 is adjacent to the back end side of the margin 7A of the holding part 7, in the tip side at which the point angle β becomes the maximum. Therefore, it may be difficult to process and produce the tip of each reamer cutting edge 6 or the tolerance near the tip of each reamer cutting edge 6 may have to be roughened because of the interference with the back end side of the margin 7A. For that reason, a clearance 30 may be formed between each reamer cutting edge 6 and the holding part 7, and thereby the minimum diameter of the reamer cutting edges 6 can be made not more than or less than the maximum diameter of the holding part 7, as illustrated.

Consequently, the reamer cutting edges 6 of which point angle β decreases smoothly can be easily produced. In addition, the portions of the reamer cutting edges 6 of which point angle β decreases smoothly can be certainly contacted with an edge of a prepared hole which has been processed by the tip cutting edges 5 and held by the holding part 7.

In the above-mentioned third implementation, the shape of the reamer cutting edges 6 is further idealized from a viewpoint of improving the tool life while securing drilling quality of an FRP. Therefore, according to the third implementation, it becomes possible to secure the drilling quality and increase the tool life of the drill 1B even when the number of the tip cutting edges 5 and the reamer cutting edges 6 is increased, especially in case of drilling an FRP.

Fourth Implementation

Figure 15:
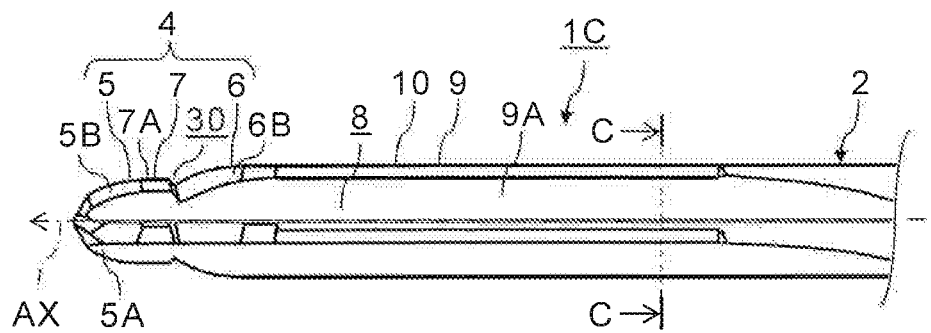
FIG. 15 is a partial front view of a drill according to the fourth implementation of the present invention.
Figure 16:
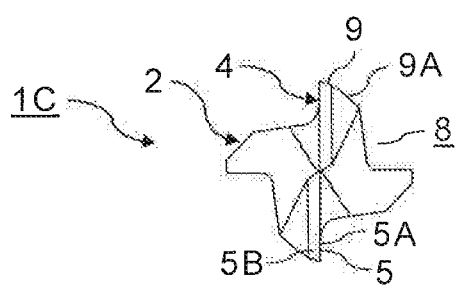
FIG. 16 is an enlarged left side view of the tip part of the drill shown in FIG. 15.
Figure 17:
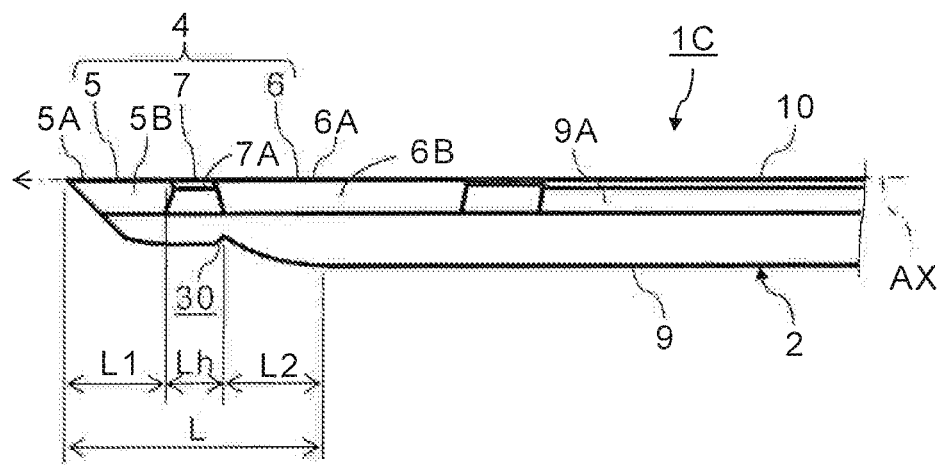
FIG. 17 is an enlarged partial top view of the tip part of the drill shown in FIG. 15.
Figure 18:
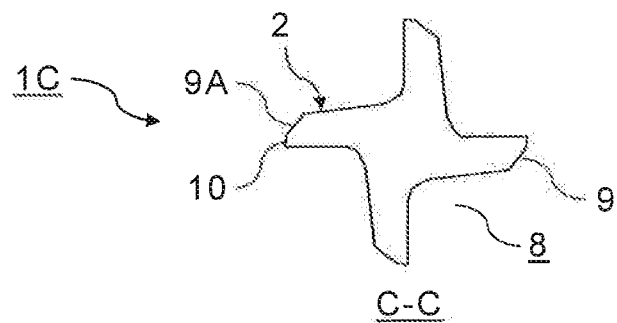
FIG. 18 is an enlarged cross-sectional view at the position C-C of the drill shown in FIG. 15.

FIG. 15 is a partial front view of a drill according to the fourth implementation of the present invention. FIG. 16 is an enlarged left side view of the tip part of the drill shown in FIG. 15. FIG. 17 is an enlarged partial top view of the tip part of the drill shown in FIG. 15. FIG. 18 is an enlarged cross-sectional view at the position C-C of the drill shown in FIG. 15.

A drill 1C in the fourth implementation shown in FIG. 15 is different from the drill 1B in the third implementation in a point that the number of the tip cutting edges 5 is different from the number of the reamer cutting edges 6. Other structures and actions of the drill 1C in the fourth implementation are not substantially different from those of the drill 1B in the third implementation. Therefore, the same signs are attached to the same elements or the corresponding elements while explanation thereof is omitted.

When the number of the tip cutting edges 5 and the reamer cutting edges 6 is increased, the web thickness of the cutting edge part 4 decreases due to increase in the number of the grooves 8 whereas the tool life is improved since the cutting amount per one cutting edge decreases. When the web thickness of the cutting edge part 4 decreases, the rigidity of the cutting edge part 4 deteriorates, which leads to degradation in the drilling quality. For that reason, the number of the tip cutting edges 5, having the relatively small radius of rotation, of which the degree of consumption due to wear and chipping is relatively small, can be made lower than the number of the reamer cutting edges 6, having the relatively large radius of rotation, of which the degree of consumption is relatively large.

In this case, the web thickness and rigidity of the tip cutting edges 5 to which cutting resistance is relatively large whereas the degree of consumption is relatively small can be secured by restricting the number of the tip cutting edges 5. Meanwhile, the progress in consumption of the reamer cutting edges 6 of which degree of consumption is relatively large can be delayed by increasing the number of the reamer cutting edges 6. As a result, the tool life of the entire drill 1C can be increased.

As a result of cutting tests, it became clear that it was preferable to make the number of the tip cutting edges 5 two or three, from a viewpoint of securing the web thickness and rigidity. Meanwhile, it is preferable to make the number of the reamer cutting edges 6 not less than three, from a viewpoint of delaying the progress of consumption. Therefore, when the number of the tip cutting edges 5 is made identical to the number of the reamer cutting edges 6 in consideration of simplifying production, it is preferable to make the number of the tip cutting edges 5 and the reamer cutting edges 6 three, as exemplified in the first to third implementations. Meanwhile, when the number of the reamer cutting edges 6 is made more than the number of the tip cutting edges 5, it is preferable to make the number of the tip cutting edges 5 two and make the number of the reamer cutting edges 6 not less than four.

Although the number of the reamer cutting edges 6 in the example shown in FIG. 18 is four in consideration of simplifying production, the number of the reamer cutting edges 6 may be not less than five so that wear resistance can be improved. As for the number of the margins 7A of the holding part 7, it is realistic to make the number of the margins 7A identical to the number of the tip cutting edges 5, and extend the margins 7A from the rear end sides of the tip cutting edges 5 respectively since the margins 7A are inserted into a prepared hole processed by the tip cutting edges 5.

Thus, the number of the tip cutting edges 5 and the number of the reamer cutting edges 6 can be determined independently from each other. Therefore, the number of the reamer cutting edges 6 in the first or second implementation may be more than the number of the tip cutting edges 5. Nevertheless, when the number of the tip cutting edges 5 is made identical to the number of the reamer cutting edges 6 in the first or second implementation, the drill 1 or the drill 1A can be produced by a simple production method by which a semi-product of the drill 1 or the drill 1A whose ridgelines of the reamer cutting edges 6 are connected with the ridgelines of the tip cutting edges 5 respectively is produced, and subsequently the holding part 7 is made by cutting work or polishing processing, as described in the first implementation. Therefore, whether the number of the tip cutting edges 5 is made identical to or different from the number of the reamer cutting edges 6 can be determined according to a production method of the drill 1 or the drill 1A, and the shape of the reamer cutting edges 6.

Note that, regardless of whether the number of the reamer cutting edges 6 is the same as the number of the tip cutting edges 5, a projection view of the outline of the cutting edge part 4 on a projection plane parallel to the tool axis AX becomes similar since the tip cutting edges 5 and the reamer cutting edges 6 rotate around the tool axis AX.

In the above-mentioned fourth implementation, the rigidity of the tip cutting edges 5 is secured by restricting the number of the tip cutting edges 5 while the life tool of the while drill 1C is intended to be increased by increasing the number of the reamer cutting edges 6.

Therefore, according to the fourth implementation, drilling quality can be secured while a tool life can be improved whether an FRP or a metal is drilled. That is, many holes can be drilled with high quality by the single drill 1C.

Actually, the drill 1C having the two tip cutting edges 5 and the four reamer cutting edges 6 has been produced, and a cutting test in which a CFRP having a thickness of 10 mm was drilled has been performed. As a result, it has been confirmed that about twice as many as holes could be drilled and the drilling speed was improved up to about 1.2 times, compared with the conventional R-drill (registered trademark) having two cutting edges.

Fifth Implementation

Figure 19:
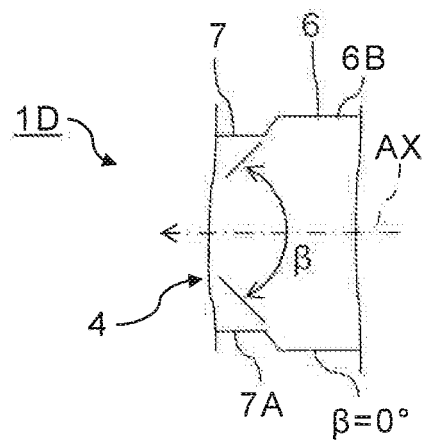
FIG. 19 is an enlarged partial projection view of reamer edges formed in a drill according to the fifth implementation of the present invention.

FIG. 19 is an enlarged partial projection view of reamer edges formed in a drill according to the fifth implementation of the present invention.

A drill 1D in the fifth implementation shown in FIG. 19 is different from each of the drill 1, 1A, 1B and 1C in the first to fourth implementations and the drill 1A in the second implementation in a point that the projected line of the ridgeline of each reamer cutting edge 6 is not a curved line but a straight line. Other structures and actions of the drill 1D in the fifth implementation are not substantially different from those of each of the drill 1, 1A, 1B and 1C in the first to fourth implementations and the drill 1A in the second implementation. Therefore, only an enlarged partial projection view of the reamer cutting edges 6 is shown, and the same signs are attached to the same elements or the corresponding elements while explanation thereof is omitted.

As exemplified by FIG. 19, a shape of the ridgeline of each reamer cutting edge 6 may be determined so that the shape of the ridgeline of the reamer cutting edge 6 on a projection plane parallel to the tool axis AX may become line segments connected with each other. In other words, each reamer cutting edge 6 can have a shape that the point angle β intermittently decreases down to 0° from the tip side toward the rear end side while the relief angle γ2 becomes nonzero at the maximum diameter position where the point angle β is 0°.

In this case, labor and costs for manufacturing the drill 1D can be reduced since a shape of the reamer cutting edges 6 can be simplified compared with a case where the point angle β of the reamer cutting edges 6 is decreased continuously like the first to fourth implementations.

Figure 20:
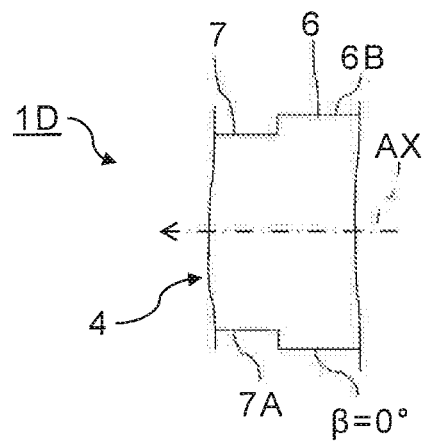
FIG. 20 is an enlarged partial projection view showing an example of the reamer edge whose point angle remains 0 degrees without decreasing.

FIG. 20 is an enlarged partial projection view showing an example of the reamer cutting edge 6 whose point angle β remains 0 degrees without decreasing.

When an FRP is a main target to be drilled, the point angle β of the reamer cutting edges 6 may not be decreased intermittently but be limited to 0°. Specifically, so long as the nonzero relief angle γ2 is formed at the maximum diameter position of the reamer cutting edges 6 at which point angle β is 0°, other shapes may be omitted or changed. Thereby, a shape of the reamer cutting edge 6 can be simplified further, and labor and costs for manufacturing the drill 1D can be reduced.

Note that, in the fifth implementation, the margins 10 may be formed behind the reamer cutting edges 6, or the portion 6C of which diameter is constant and maximum may be formed like the second implementation. Moreover, a shape of the reamer cutting edge 6 can be simplified by making the relief angle γ2 of the reamer cutting edge 6 decrease intermittently according to the change of the point angle β, or constant. As a matter of course, the number of the reamer cutting edges 6 may be made more than that of the tip cutting edges 5 like the fourth implementation.

Sixth Implementation

Figure 21:
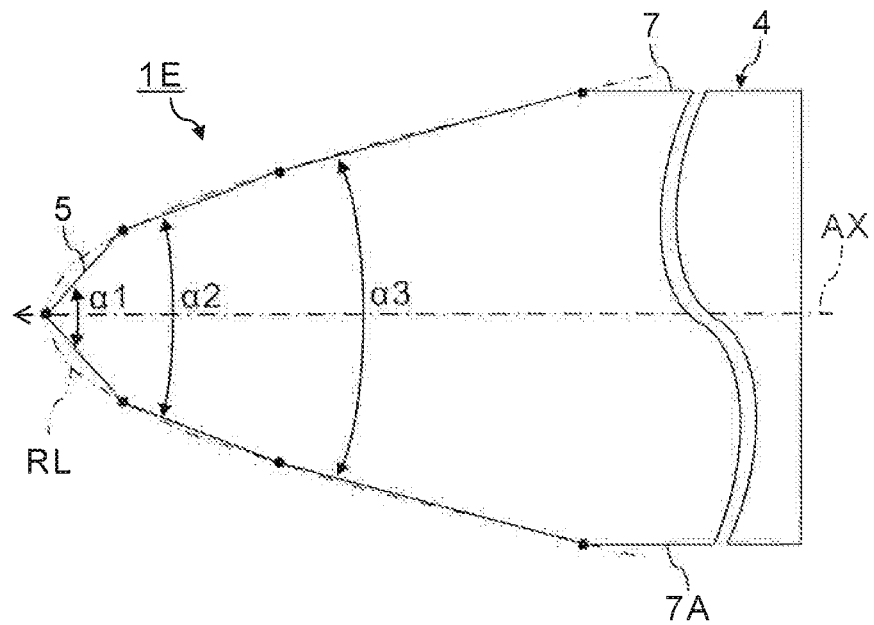
FIG. 21 is a projection view showing the first example of a shape of a tip cutting edge formed in a drill according to the sixth implementation of the present invention.
Figure 22:
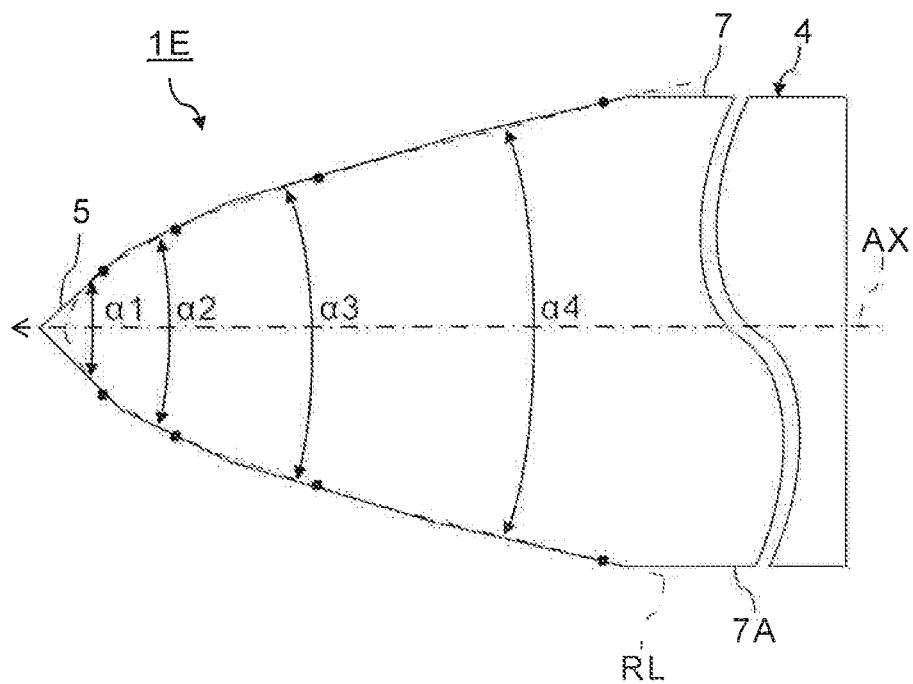
FIG. 22 is a projection view showing the second example of a shape of a tip cutting edge formed in a drill according to the sixth implementation of the present invention.
Figure 23:
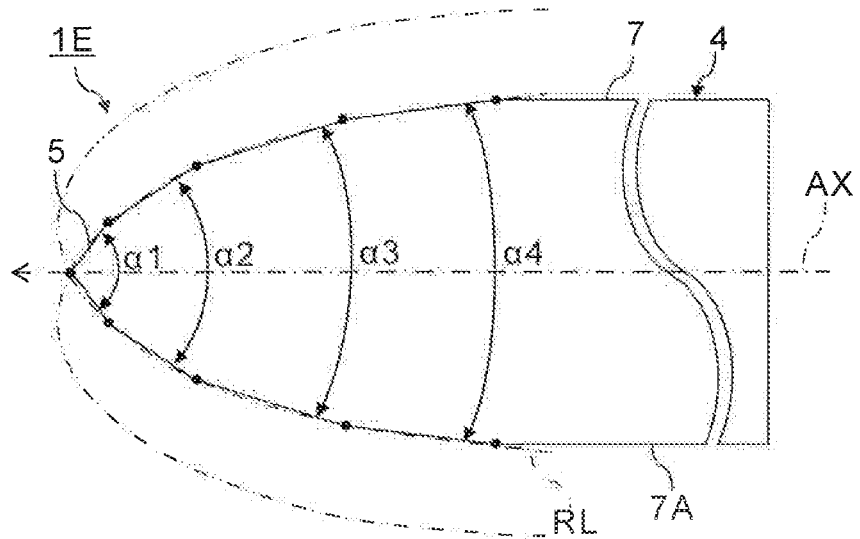
FIG. 23 is a projection view showing the third example of a shape of a tip cutting edge formed in a drill according to the sixth implementation of the present invention.
Figure 24:
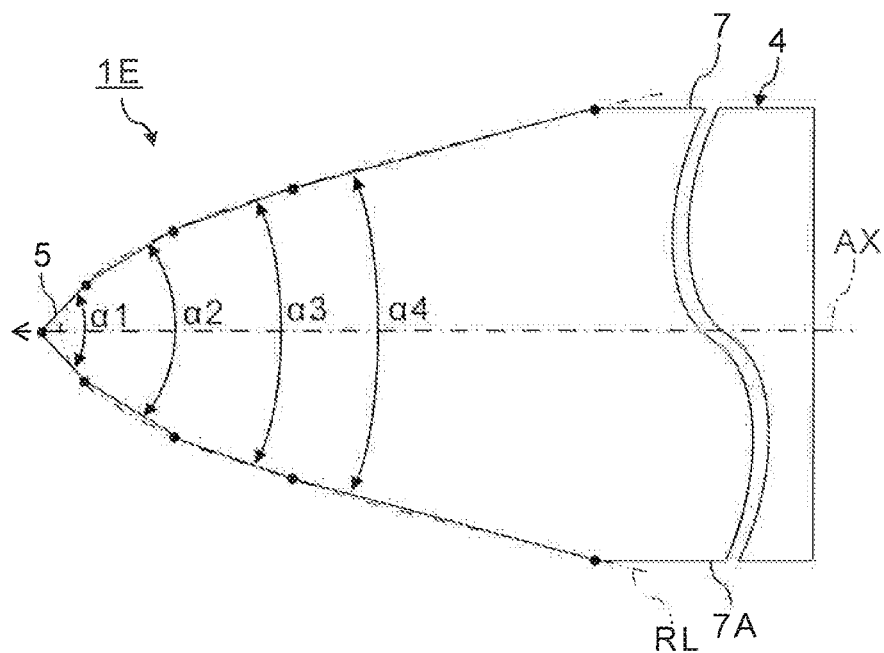
FIG. 24 is a projection view showing the fourth example of a shape of a tip cutting edge formed in a drill according to the sixth implementation of the present invention.

FIG. 21 is a projection view showing the first example of a shape of a tip cutting edge formed in a drill according to the sixth implementation of the present invention. FIG. 22 is a projection view showing the second example of a shape of a tip cutting edge formed in a drill according to the sixth implementation of the present invention. FIG. 23 is a projection view snowing the third example of a shape of a tip cutting edge formed in a drill according to the sixth implementation of the present invention. FIG. 24 is a projection view showing the fourth example of a shape of a tip cutting edge formed in a drill according to the sixth implementation of the present invention.

A drill 1E in the sixth implementation shown in each of FIG. 21 to FIG. 24 is different from each of the drills 1, 1A, 1B, 1C and 1D in the other implementations in a point that projected lines of the ridgelines of the tip cutting edges 5 and the reamer cutting edges 6 are not curved lines but line segments connected with each other. Other structures and actions of the drill 1E in the sixth implementation are not substantially different from those of each of the drills 1, 1A, 1B, 1C and 1D in the other implementations. Therefore, only a projected view of the cutting edge parts 4 is shown, and the same signs are attached to the same elements or the corresponding elements while explanation thereof is omitted.

Although an example in which a projected view of the ridgeline of the reamer cutting edge 6 was made at least one line segment has been explained in the fifth implementation, a projected view of the ridgeline of the tip cutting edge 5 may also be made connected line segments. Specifically, the shapes of the respective ridgelines of the tip cutting edges 5 and the reamer cutting edges 6 can be determined so that a projected line of each ridgeline of the tip cutting edges 5 and the reamer cutting edges 6 may be a polygonal line which simulates a quadratic curve, such as a parabola and an ellipse. In this case, the drill 1E can also be classified into a multi-point-angle drill which has the tip cutting edges 5, having the point angles α, and the reamer cutting edges 6, having the single point angle β of 0° or the point angles β.

As a concrete example, the shape of the tip cutting edge 5 can be determined so that a projected line of the ridgelines of the tip cutting edges 5 on a projection plane parallel to the tool axis AX may be a polygonal line, symmetric with respect to a projected line of the tool axis AX as the center line, derived by connecting, with each other, at least six line segments of which respective both ends are on the reference line RL consisting of a single parabola symmetric with respect to the projected line of the tool axis AX as the center line, as exemplified by FIG. 21. In this case, each tip cutting edge 5 is an at least three multi-stage cutting edge having at least three point angles α1, α2 and α3. Note that, the reference line RL may be replaced from a parabola to an ellipse.

Alternatively, the shape of the tip cutting edge 5 can be determined so that a projected line of the ridgelines of the tip cutting edges 5 on a projection plane parallel to the tool axis AX may be a polygonal line, symmetric with respect to a projected line of the tool axis AX as the center line, derived by connecting, with each other, at least eight line segments which are each tangent on the reference line RL consisting of a single parabola symmetric with respect to the projected line of the tool axis AX as the center line, as exemplified by FIG. 22. In this case, each tip cutting edge 5 is an at least four multi-stage cutting edge having at least four point angles α1, α2, α3 and α4. Note that, the reference line RL may be replaced from a parabola to an ellipse.

As another example, the shape of the tip cutting edge 5 can be determined so that a projected line of the ridgelines of the tip cutting edges 5 on a projection plane parallel to the tool axis AX may be a polygonal line, symmetric with respect to a projected line of the tool axis AX as the center line, derived by connecting, with each other, at least six line segments of which respective both ends are on the reference line RL consisting of two ellipses, in the side closer to the projected line of the tool axis AX, symmetric with respect to the projected line of the tool axis AX as the center line, as exemplified by FIG. 23. In this case, each tip cutting edge 5 is an at least three multi-stage cutting edge having at least three point angles α1, α2 and α3. In an example shown in FIG. 23, four point angles α1, α2, α3 and α4 have been formed. Note that, the reference line RL may be replaced from two ellipses to two parabolas.

As yet another example, some of line segments composing a polygonal line which is a projected line of the ridgelines of the tip cutting edges 5 on a projection plane parallel to the tool axis AX may be each tangent on the reference line RL, such as a parabola, parabolas, an ellipse, or ellipses while the others may be line segments of which respective both ends are on the reference line RL, as exemplified by FIG. 24. In an example shown in FIG. 24, the projected line of the ridgelines forming the maximum point angle α1 of the tip cutting edges 5 consists of two symmetric line segments which are each tangent on the reference line RL consisting of a single parabola or ellipse symmetric with respect to the projected line of the tool axis AX as the center line while the projected lines of the ridgelines forming the other point angles α2, α3 and α4 consist of symmetric line segments of which respective both ends are on the reference line RL.

Note that, some of line segments composing a projected line of the ridgelines of the tip cutting edges 5 on a projection plane parallel to the tool axis AX may be replaced with curved lines, such as arcs. For example, when line segments are connected to each other by an arc disposed therebetween, the tip cutting edge 5 can have a smooth shape without corners. In that case, a risk of causing chipping on the tip cutting edge 5 can be reduced, and thereby a tool life can be lengthened. Alternatively, as explained in the first implementation with reference to FIG. 5 and FIG. 6, the shapes of the ridgelines of the tip cutting edges 5 may be determined so that only the projected line of the ridgelines of the tip cutting edges 5 which form the maximum point angle α at the tip point may consist of line segments while the projected lines of the other ridgelines may consist of curved lines each derived by smoothly connecting arcs, having mutually different radii, with each other.

When the point angle α of the tip cutting edge 5 is decreased intermittently, decreasing the relief angle γ1 intermittently according to the decrease of the point angle α leads to the simplification of the shape of the tip cutting edge 5. Therefore, both of the point angle α and the relief angle γ1 of the tip cutting edge 5 may be decreased continuously or intermittently from the tip side toward the rear end side. In addition, a shape obtained by projecting a passing area of the tip cutting edges 5, rotating around the tool axis AX, on a projection plane parallel to the tool axis AX can be made a shape, derived by connecting line segments and/or curved lines, such as circular arcs with each other, line symmetric with regard to a projected line of the tool axis AX on the projection plane as the center line, so that the shape of the tip cutting edge 5 can be simplified.

As a concrete example, the shape of the tip cutting edge 5 can be determined so that positions of at least seven points on curved lines and/or line segments composing a projected line of the ridgelines of the tip cutting edges 5 on a projection plane may be on a quadratic curve or quadratic curves, consisting of a single parabola, two parabolas, a single ellipse or two ellipses, line symmetric with regard to the projected line of the tool axis AX on the projection plane as the center line. Thereby, an effect that cutting resistance to the tip cutting edges 5 and the degree of wear progress of the tip cutting edges 5 can be uniformed as much as possible in the length Lh direction of the tip cutting edges 5 can be obtained as explained in the first implementation.

Note that, when the point angle β of the reamer cutting edges 6 is also decreased continuously or intermittently, the reamer cutting edge 6 can have a shape derived by connecting line segments and/or curved lines, such as arcs, with each other on a projection plane, as described with reference to FIG. 14 and the like in the third implementation. Specifically, the shape of the reamer cutting edge 6 can be determined so that a shape obtained by projecting a passing area of the reamer cutting edges 6, rotated around the tool axis AX, on a projection plane parallel to the tool axis AX may become a shape obtained by connecting line segments and/or curved lines, such as arcs, with each other, and line symmetric with regard to the projected line of the tool axis AX on the projection plane as the center line.

As for the shape of the reamer cutting edge 6, the shape of the projected line on a projection plane can be also determined using the reference line consisting of a quadratic curve or quadratic curves same as those for determining the shape of the tip cutting edge 5, as described with reference to FIG. 5 and the like in the first implementation. In this case, a merit that a production method of forming the holding part 7 on a semi-product of which ridgelines of the tip cutting edges 5 have been connected with those of the reamer cutting edges 6 respectively can be adopted can be obtained. Alternatively, the shape of the projected line of the reamer cutting edge 6 may be determined based on a quadratic curve different from a quadratic curve for determining the shape of the projected line of the tip cutting edge 5 so that the change amount of the point angle β of the reamer cutting edges 6 may be reduced, as described with reference to FIG. 14 and the like in the third implementation.

According to the above-mentioned sixth implementation, a shape of each ridgeline of the tip cutting edges 5 and the reamer cutting edges 6 can be simplified further, and thereby labor and costs for producing the drill 1E can be reduced further.

Note that, the shape of the ridgeline of the reamer cutting edge 6 may be a curved one in which the point angle β continuously and smoothly decreases as described in the third implementation while only the point angle α of the tip cutting edges 5 may be decreased intermittently for simplification as exemplified in FIG. 21 to FIG. 24. In that case, as for the tip cutting edge 5 in which wear progress is relatively slow because of the small radius of rotation, production costs can be reduced by simplifying the shape. Meanwhile, as for the reamer cutting edge 6 in which wear progress is relatively fast because of the large radius of rotation, wear progress can be effectively delayed by making the shape preferable.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A drill comprising:
at least one first cutting edge for drilling a prepared hole in a workpiece, the at least one first cutting edge being formed in a tip side of the drill, a first point angle of the at least one first cutting edge at a tip position being more than 0 degrees and less than 180 degrees, the first point angle continuously or intermittently decreasing from the tip side toward a rear end side of the drill, a first relief angle of the at least one first cutting edge continuously or intermittently decreasing from the tip side toward the rear end side;
at least one second cutting edge for reaming the prepared hole, the at least one second cutting edge being formed at a position away in the rear end side from the at least one first cutting edge, the at least one second cutting edge having a second relief angle at a maximum diameter position of the at least one second cutting edge; and
a holding part that reduces deflection of the at least one second cutting edge, the holding part including margins and being formed between the at least one first cutting edge and the at least one second cutting edge, the holding part being insertable into the prepared hole, and
wherein the at least one first cutting edge and the at least one second cutting edge are configured such that the at least one first cutting edge is defined by a first quadratic curvature and the at least one second cutting edge is defined by a second quadratic curvature, with the second quadratic curvature defining a point angle that decreases continuously or intermittently from an origination location of the at least one second cutting edge that is closest to the holding part to a more rearward location of the at least one second cutting edge along the drill, and
wherein the holding part is free of cutting edges.

2. The drill according to claim 1, wherein the first quadratic curvature has an elliptical or parabolic configuration, and the second quadratic curvature has an elliptical or parabolic configuration that is different than that of the first quadratic curvature.

3. The drill according to claim 1, wherein the point angle of the second quadratic curvature decreases continuously from the origination location to the more rearward location.

4. The drill according to claim 1,
wherein the at least one first cutting edge consists of two or three first cutting edges while the at least one second cutting edge consists of not less than three second cutting edges.

5. The drill according to claim 1,
wherein the at least one first cutting edge consists of first cutting edges while the at least one second cutting edge consists of second cutting edges more than the first cutting edges.

6. The drill according to claim 1,
wherein a clearance is formed between the at least one second cutting edge and a margin region of the holding part, and
a minimum diameter of the at least one second cutting edge is not more than a maximum diameter of the holding part.

7. The drill according to claim 1,
wherein the point angle of the at least one second cutting edge decreases intermittently or continuously down to 0 degrees, with the 0 degrees being at the maximum diameter position.

8. The drill according to claim 7,
wherein the first and second quadratic curvatures are selected from a group of quadratic shapes consisting of an ellipse and a parabola, and wherein the first and second quadratic curvatures have a common one of said quadratic shapes.

9. The drill according to claim 7,
wherein a clearance is formed between the at least one second cutting edge and a margin region of the holding part, and
a minimum diameter of the at least one second cutting edge is not more than a maximum diameter of the holding part.

10. The drill according to claim 7,
wherein the at least one first cutting edge consists of two or three first cutting edges while the at least one second cutting edge consists of not less than three second cutting edges.

11. The drill according to claim 7,
wherein the at least one first cutting edge consists of first cutting edges while the at least one second cutting edge consists of second cutting edges more than the first cutting edges.

12. The drill according to claim 8,
wherein a clearance is formed between the at least one second cutting edge and a margin region of the holding part, and
a minimum diameter of the at least one second cutting edge is not more than a maximum diameter of the holding part.

13. The drill according to claim 8,
wherein the at least one first cutting edge consists of two or three first cutting edges while the at least one second cutting edge consists of not less than three second cutting edges.

14. The drill according to claim 8,
wherein the at least one first cutting edge consists of first cutting edges while the at least one second cutting edge consists of second cutting edges more than the first cutting edges.

15. The drill according to claim 6,
wherein the at least one first cutting edge consists of two or three first cutting edges while the at least one second cutting edge consists of not less than three second cutting edges.

16. The drill according to claim 6,
wherein the at least one first cutting edge consists of first cutting edges while the at least one second cutting edge consists of second cutting edges more than the first cutting edges.

17. A method of producing a drilled product comprising:
drilling the workpiece with the drill according to claim 7, in order to produce the drilled product.

* * * * *